Figure 5:
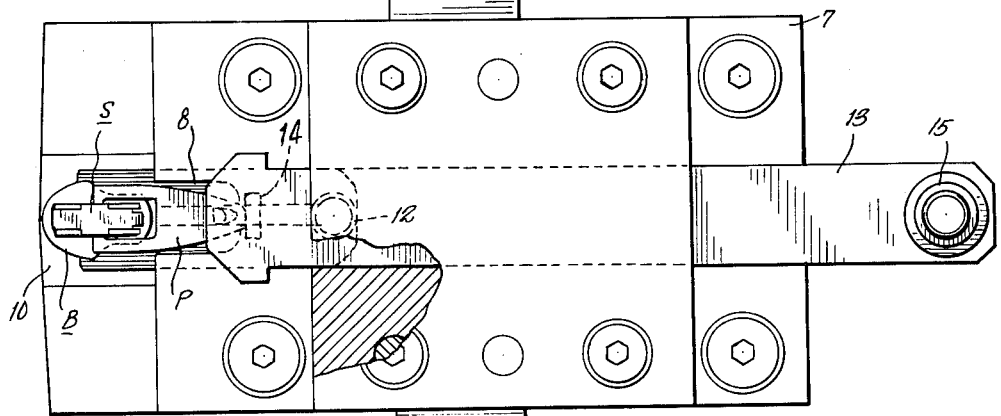

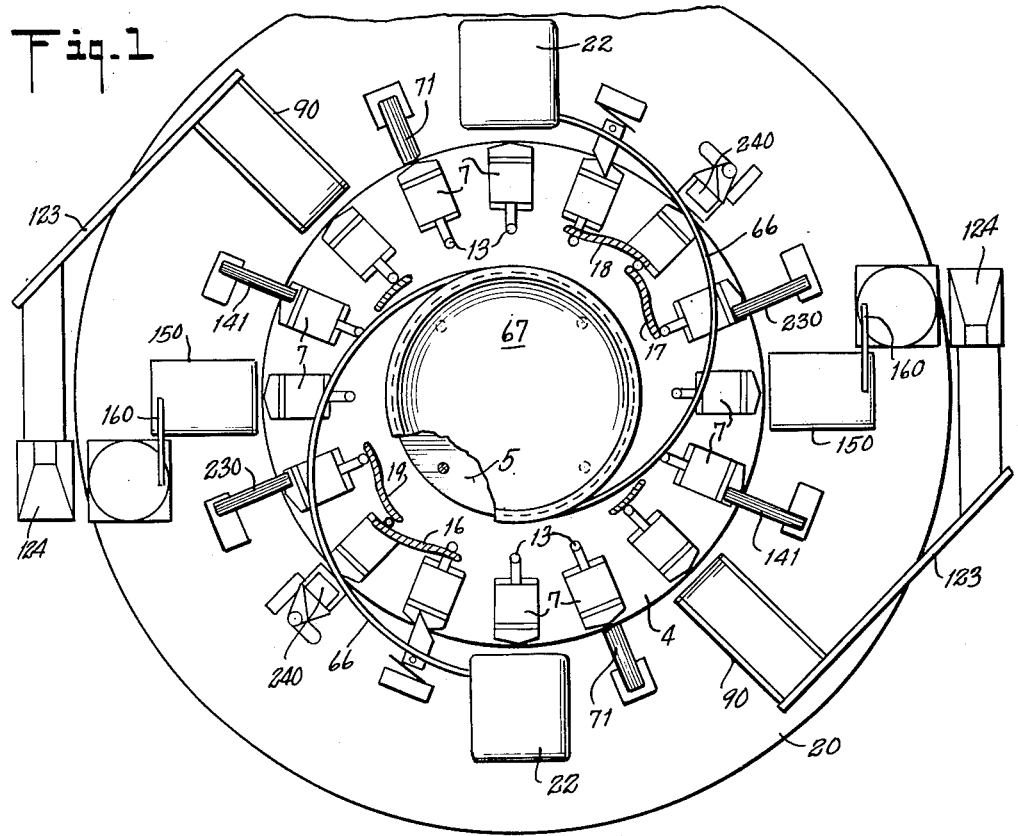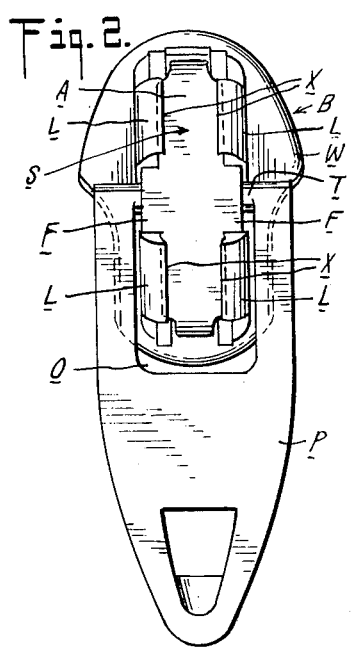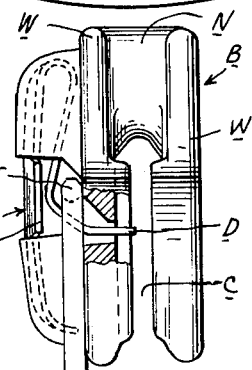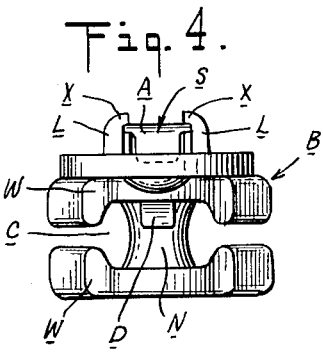
INVENTOR.
LOUIS P. MAZURA
BY
ATTORNEY

June 30, 1964   L. P. MAZURA   3,138,852
AUTOMATIC LOCK SLIDER ASSEMBLING MACHINE
Filed Dec. 26, 1961   17 Sheets-Sheet 2

INVENTOR.
LOUIS P. MAZURA
BY
R. E. Meech
ATTORNEY

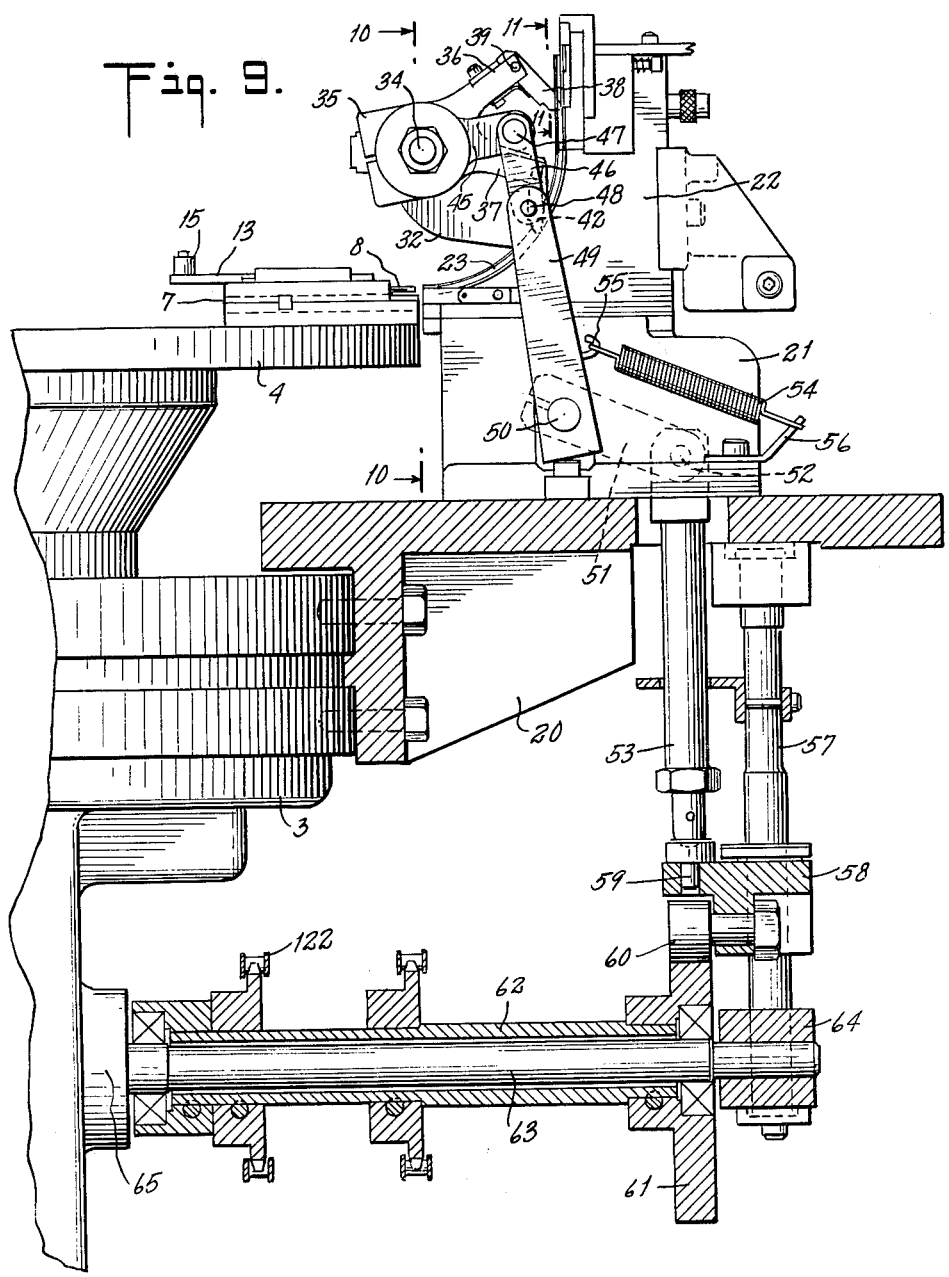

June 30, 1964 L. P. MAZURA 3,138,852
AUTOMATIC LOCK SLIDER ASSEMBLING MACHINE
Filed Dec. 26, 1961 17 Sheets-Sheet 4
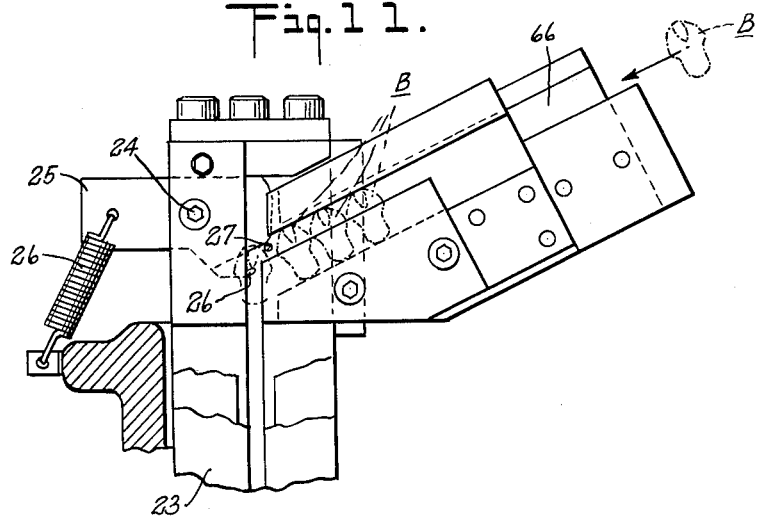
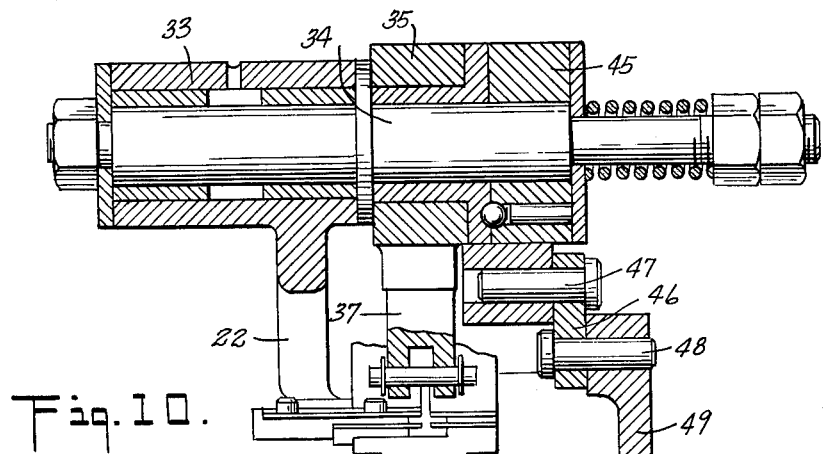
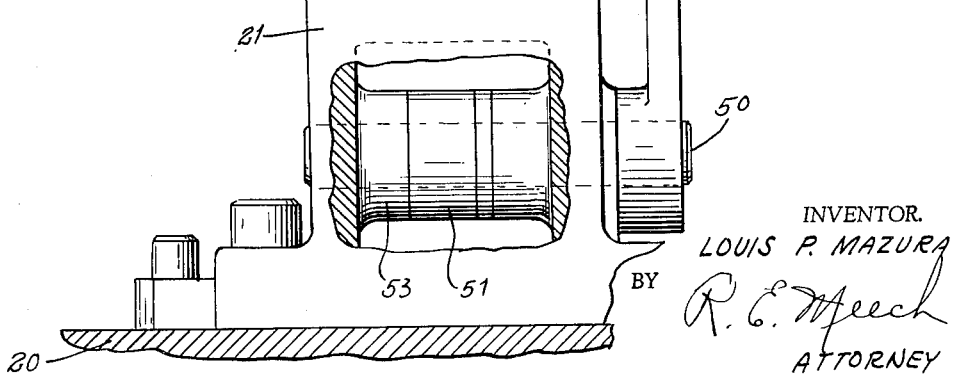
INVENTOR.
LOUIS P. MAZURA
BY
R. E. Meech
ATTORNEY

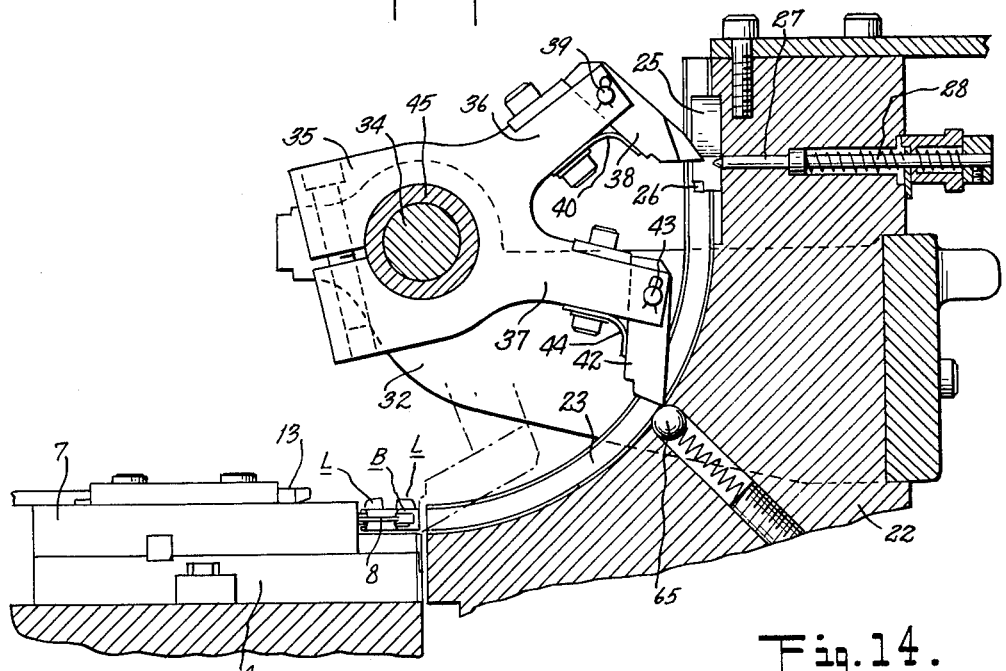
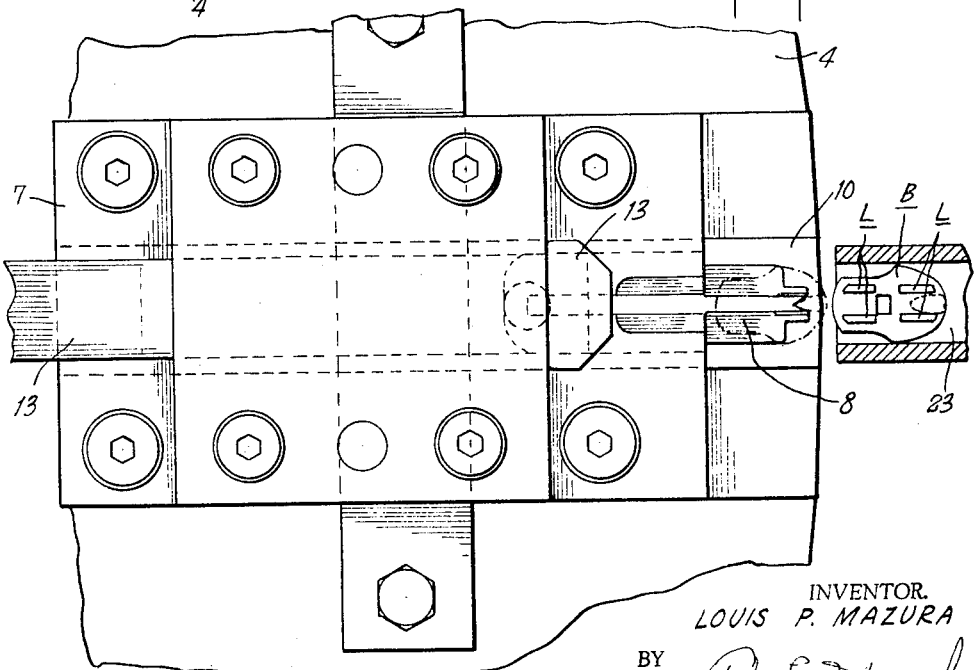

June 30, 1964 L. P. MAZURA 3,138,852
AUTOMATIC LOCK SLIDER ASSEMBLING MACHINE
Filed Dec. 26, 1961 17 Sheets-Sheet 7

INVENTOR.
LOUIS P. MAZURA
BY
R. E. Meech
ATTORNEY

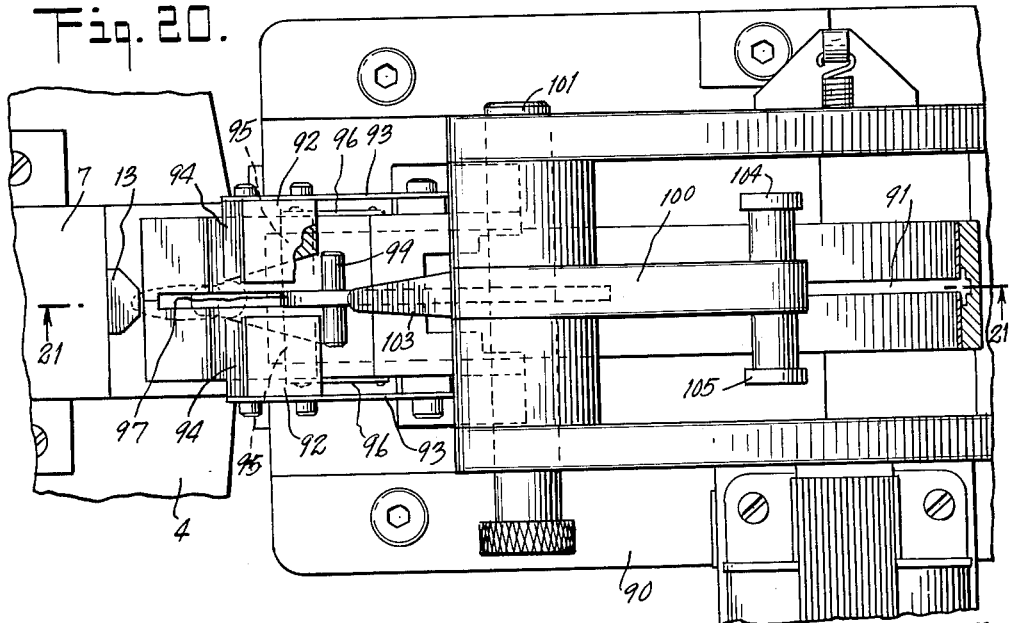
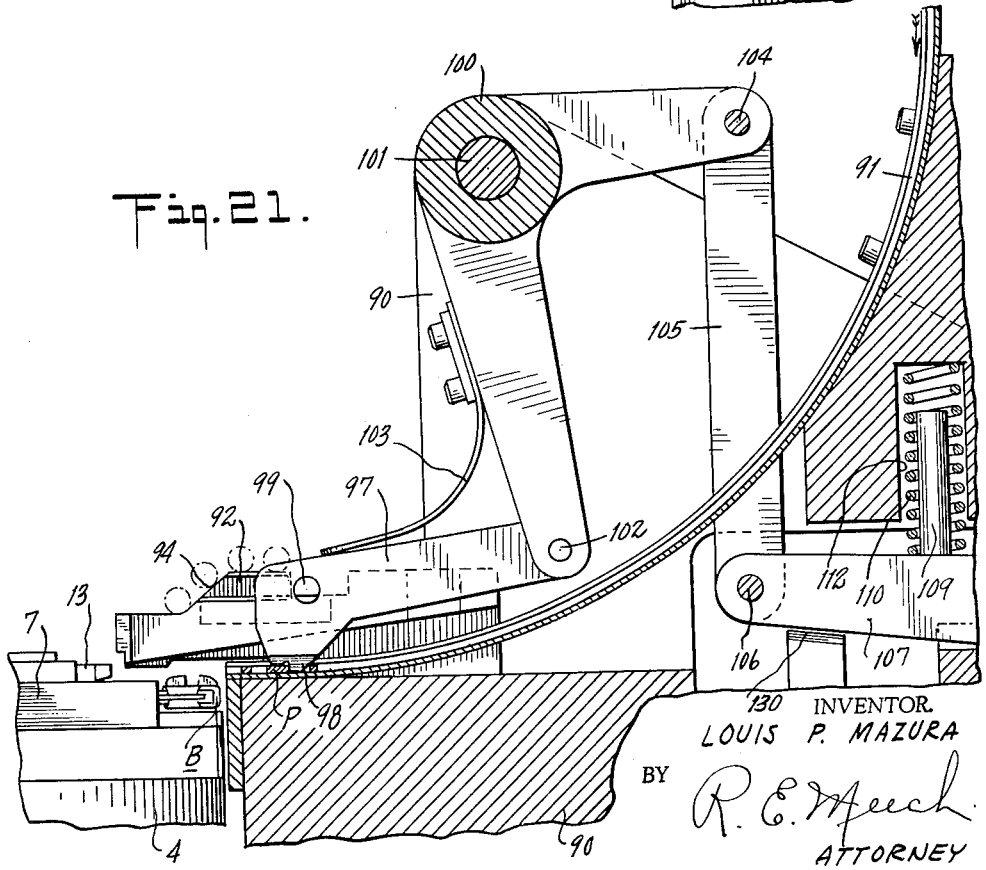

June 30, 1964 L. P. MAZURA 3,138,852
AUTOMATIC LOCK SLIDER ASSEMBLING MACHINE
Filed Dec. 26, 1961 17 Sheets-Sheet 9

INVENTOR.
LOUIS P. MAZURA
BY
R. E. Meech
ATTORNEY

June 30, 1964 L. P. MAZURA 3,138,852
AUTOMATIC LOCK SLIDER ASSEMBLING MACHINE
Filed Dec. 26, 1961 17 Sheets-Sheet 14

INVENTOR.
LOUIS P. MAZURA
BY
R. E. Meech
ATTORNEY

June 30, 1964  L. P. MAZURA  3,138,852
AUTOMATIC LOCK SLIDER ASSEMBLING MACHINE
Filed Dec. 26, 1961  17 Sheets-Sheet 15
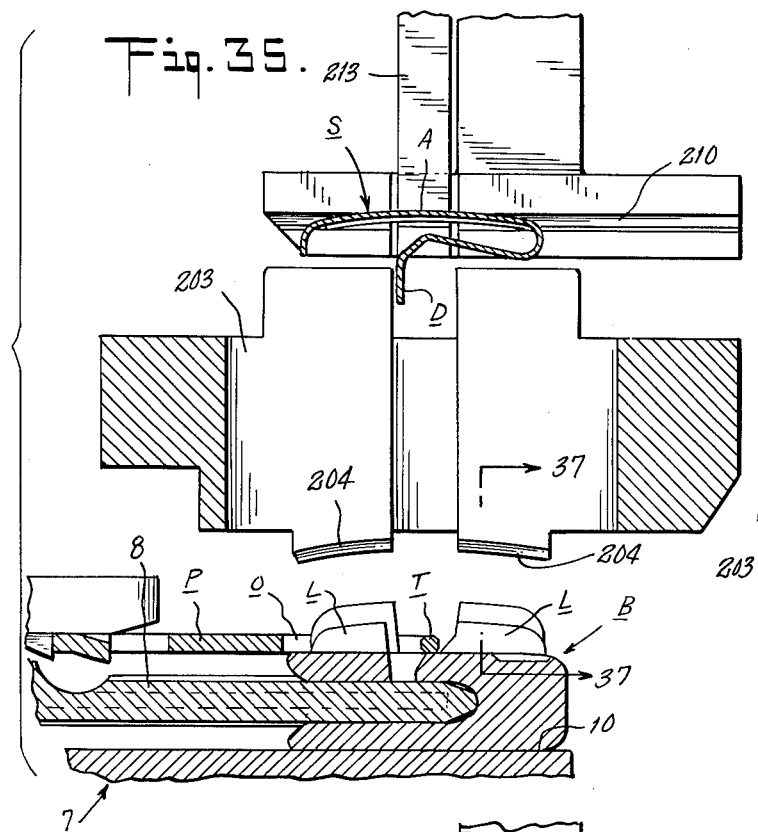
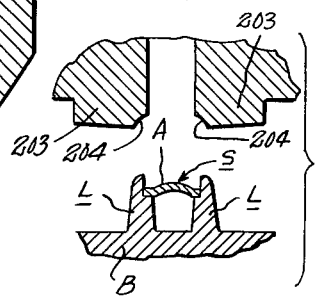
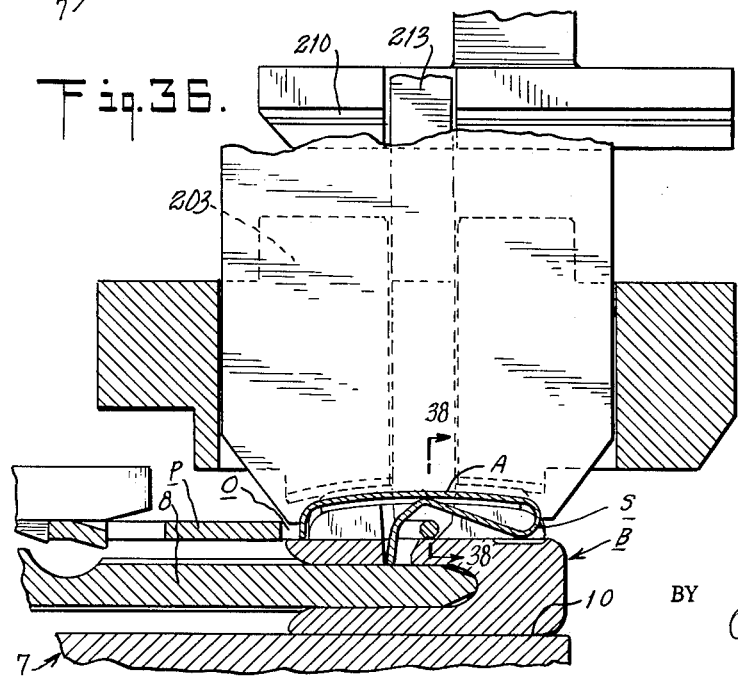
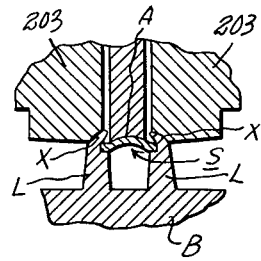
INVENTOR.
LOUIS P. MAZURA
BY
R. E. Meech
ATTORNEY

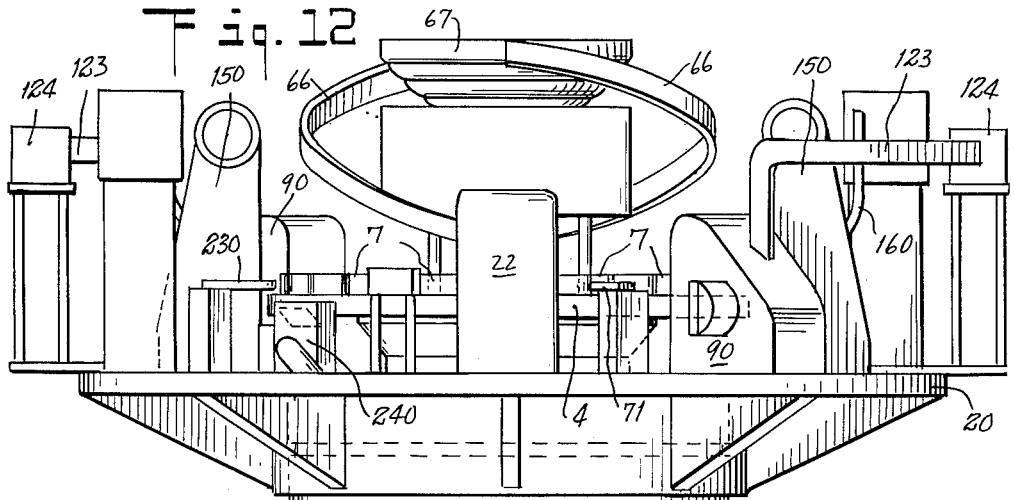
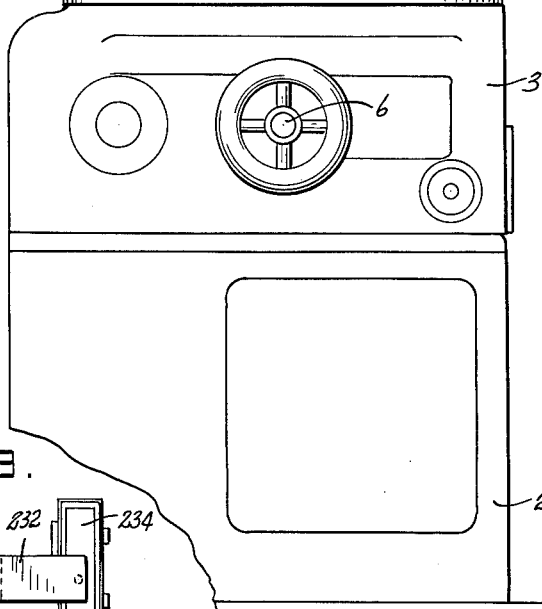
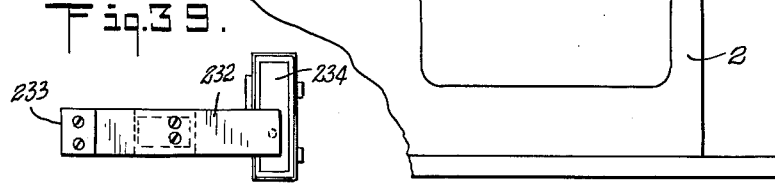
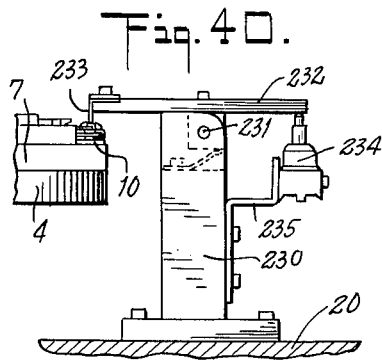

INVENTOR.
LOUIS P. MAZURA
BY
ATTORNEY

United States Patent Office 3,138,852
Patented June 30, 1964

3,138,852
AUTOMATIC LOCK SLIDER ASSEMBLING MACHINE
Louis P. Mazura, Meadville, Pa., assignor to Talon, Inc., a corporation of Pennsylvania
Filed Dec. 26, 1961, Ser. No. 162,050
27 Claims. (Cl. 29—208)

This invention relates to slide fasteners and, more particularly to a machine for automatically assembling the parts of automatic lock sliders for use therewith.

It is now common practice to provide slide fasteners with automatic lock sliders. Such a slider consists usually of at least three parts, namely a slider body, a locking member and a pull member assembled in various ways and in a manner well known to those skilled in the art. A most common type of automatic lock slider consists of a slider body having lugs carried thereby, a combined locking and spring member having a locking prong arranged therewith which is adapted to enter in the space below the fastener elements of the slide fastener to lock the slider against unintentional movement in a well known manner, and a pull member for manipulating the locking member and slider. It is to a machine for automatically assembling the combined spring and locking member and pull member on the slider body that the present invention relates.

Accordingly, it is the general object of the present invention to provide a new and novel machine which efficiently and effectively assembles automatically the various parts of automatic lock sliders for slide fasteners.

It is another object of the invention to provide such an assembling machine having means incorporated therewith for detecting the presence or absence of a necessary part of the completed lock slider assembly so as to insure that all parts are assembled in the proper manner to provide fully and completely assembled automatic lock sliders.

It is a further object of this invention to provide a machine having a rotatable turret which is indexed to several stations arranged therearound whereby the pull member and the lock spring member are successively positioned on and attached to successive slider bodies arranged circumferentially around the periphery of the turret.

It is a more specific object of the invention to provide a machine including a rotatable turret having spaced-apart slider body holding means arranged circumferentially around the periphery thereof which are indexed to several stations arranged therearound whereby a slider body is automatically delivered to a slider holding means at one station, a pull member is automatically delivered to and positioned on a slider body to another station, a combined spring and locking member is delivered to and securely attached to a slider body at still another station and the completely assembled sliders ejected from the machine at the last station.

Various other objects and advantages of this invention will be more apparent in the course of the following specification, and will be particularly pointed out in the appended claims.

In the accompanying drawings, there is shown for the purpose of illustration, and embodiment which my invention may assume in practice.

Figure 6:
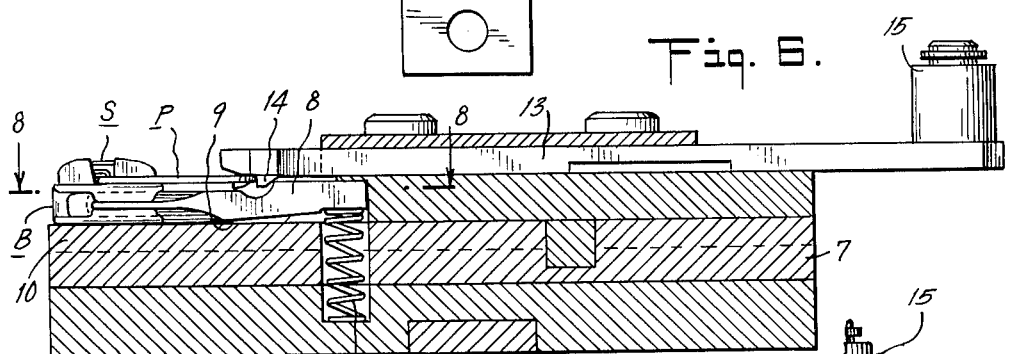
Figure 7:
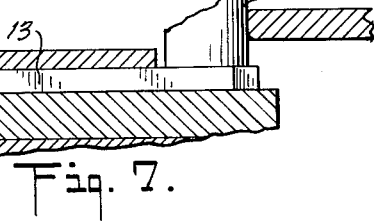
Figure 8:
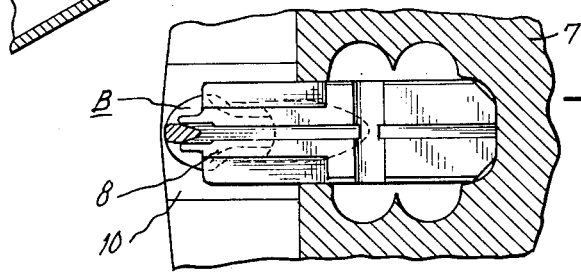
Figure 15:
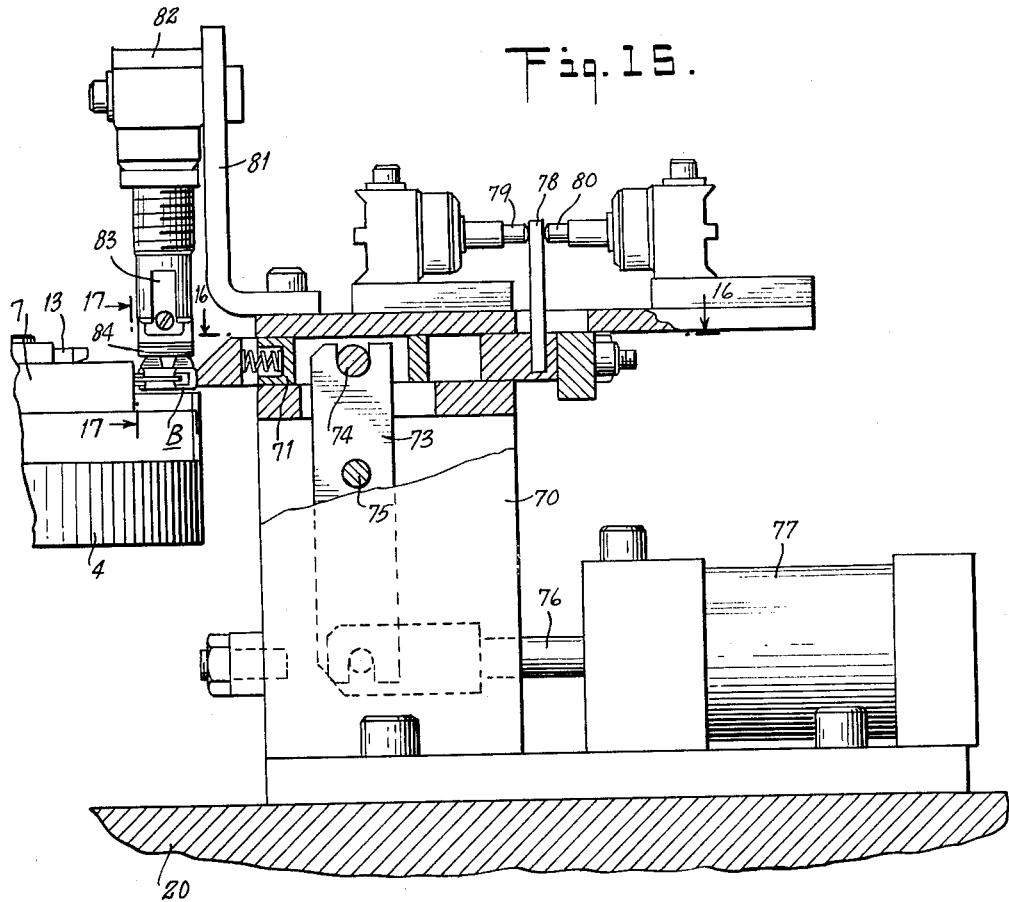
Figure 16:
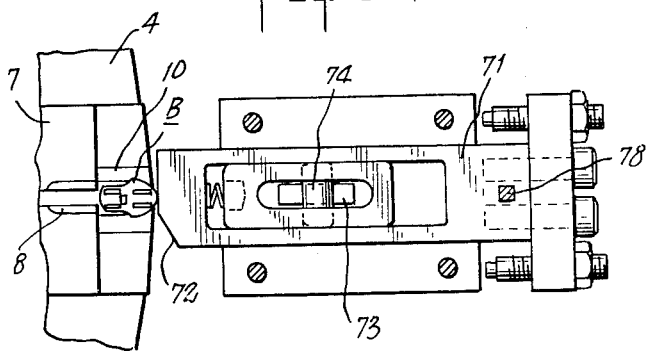
Figure 17:
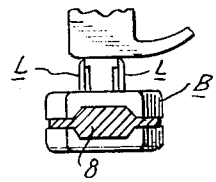
Figure 18:
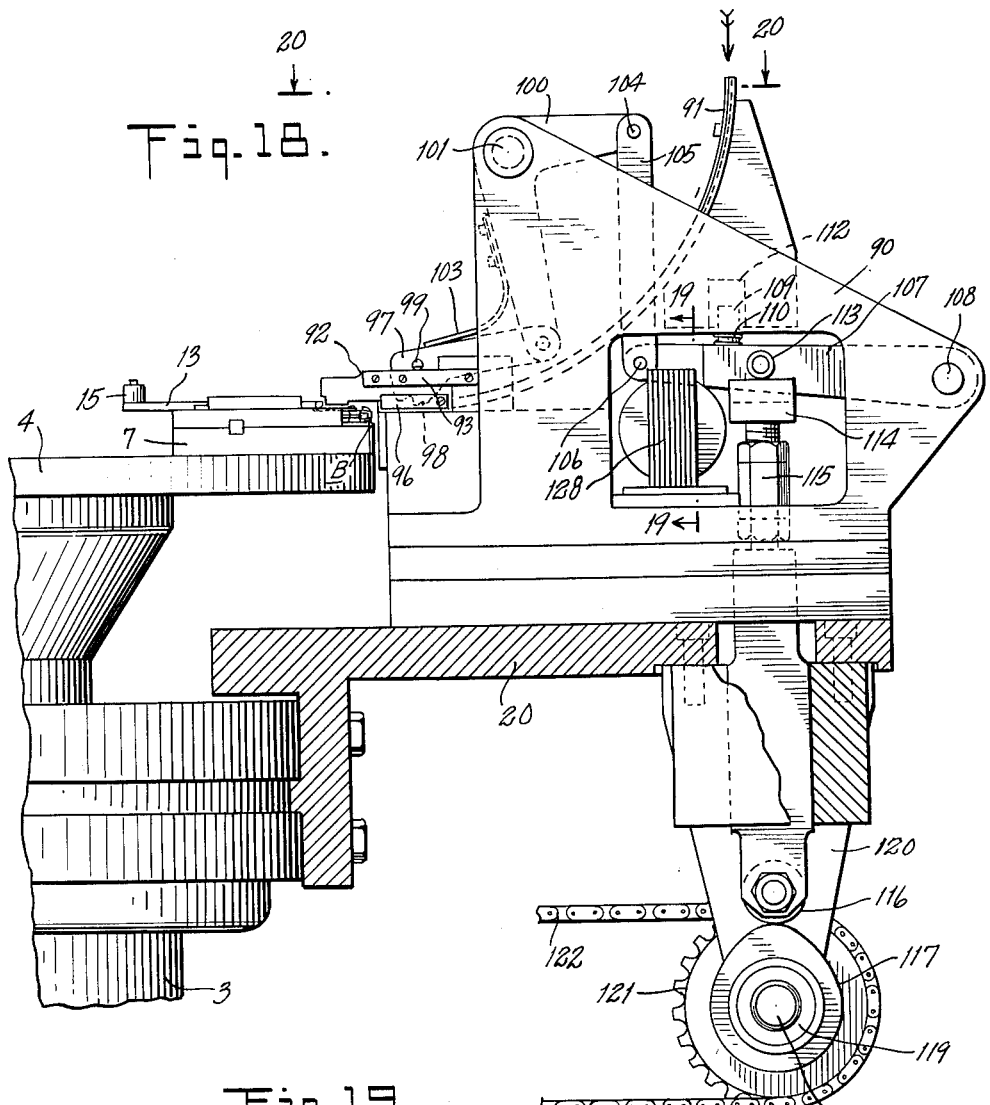
Figure 19:
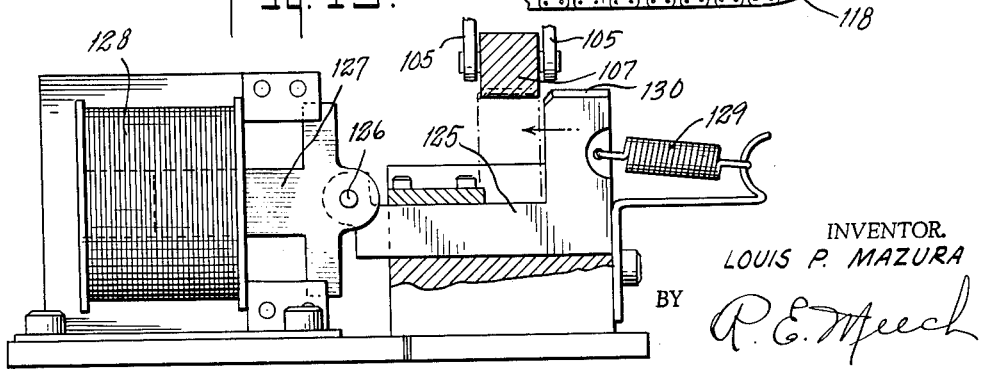
Figure 22:
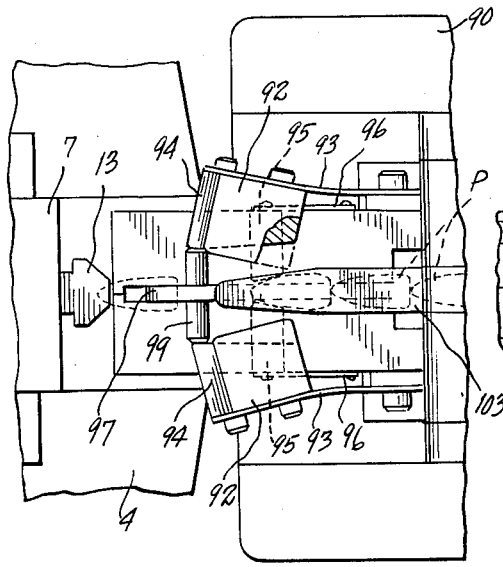
Figure 23:
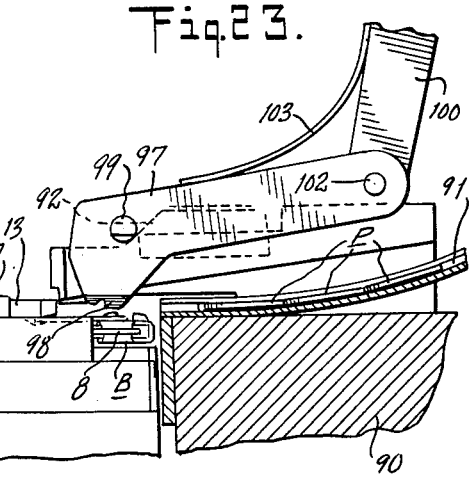
Figure 24:
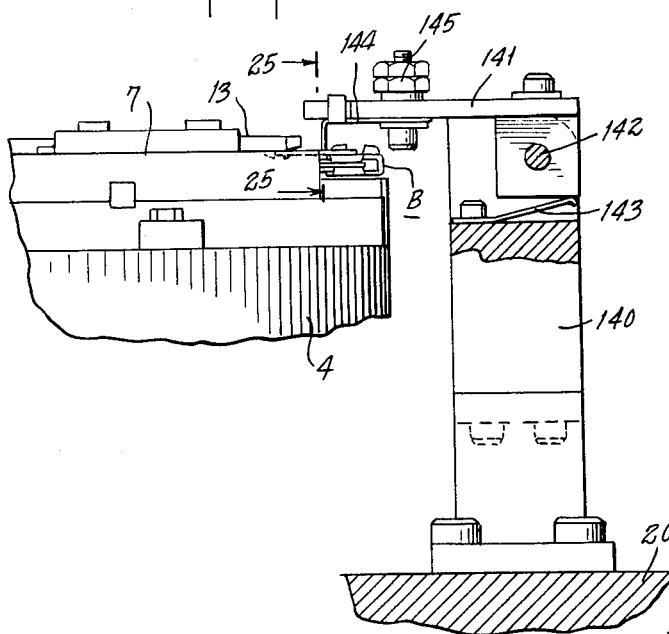
Figure 25:
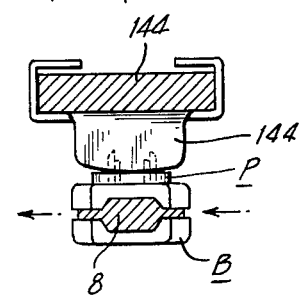
Figure 26:
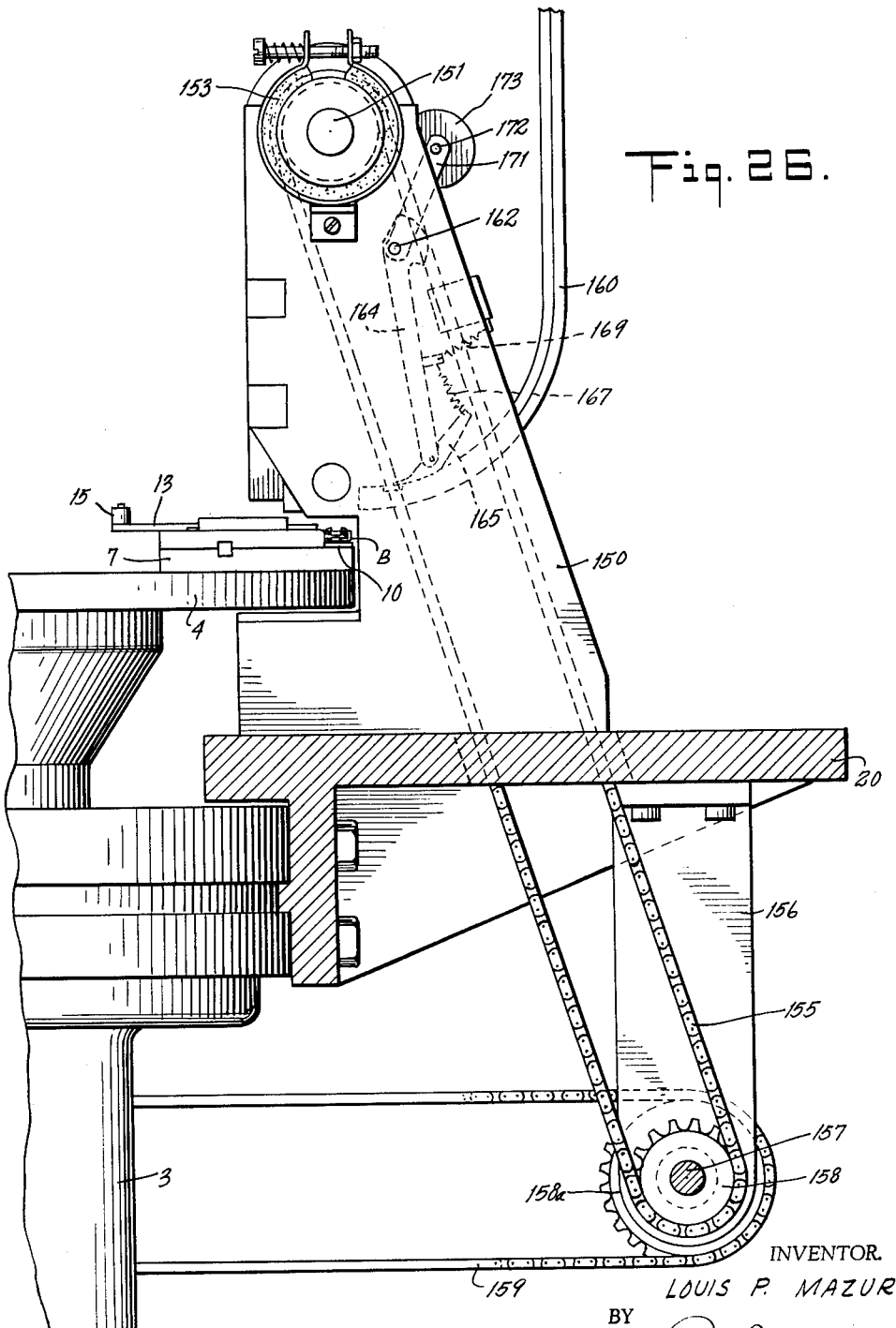
Figure 27:
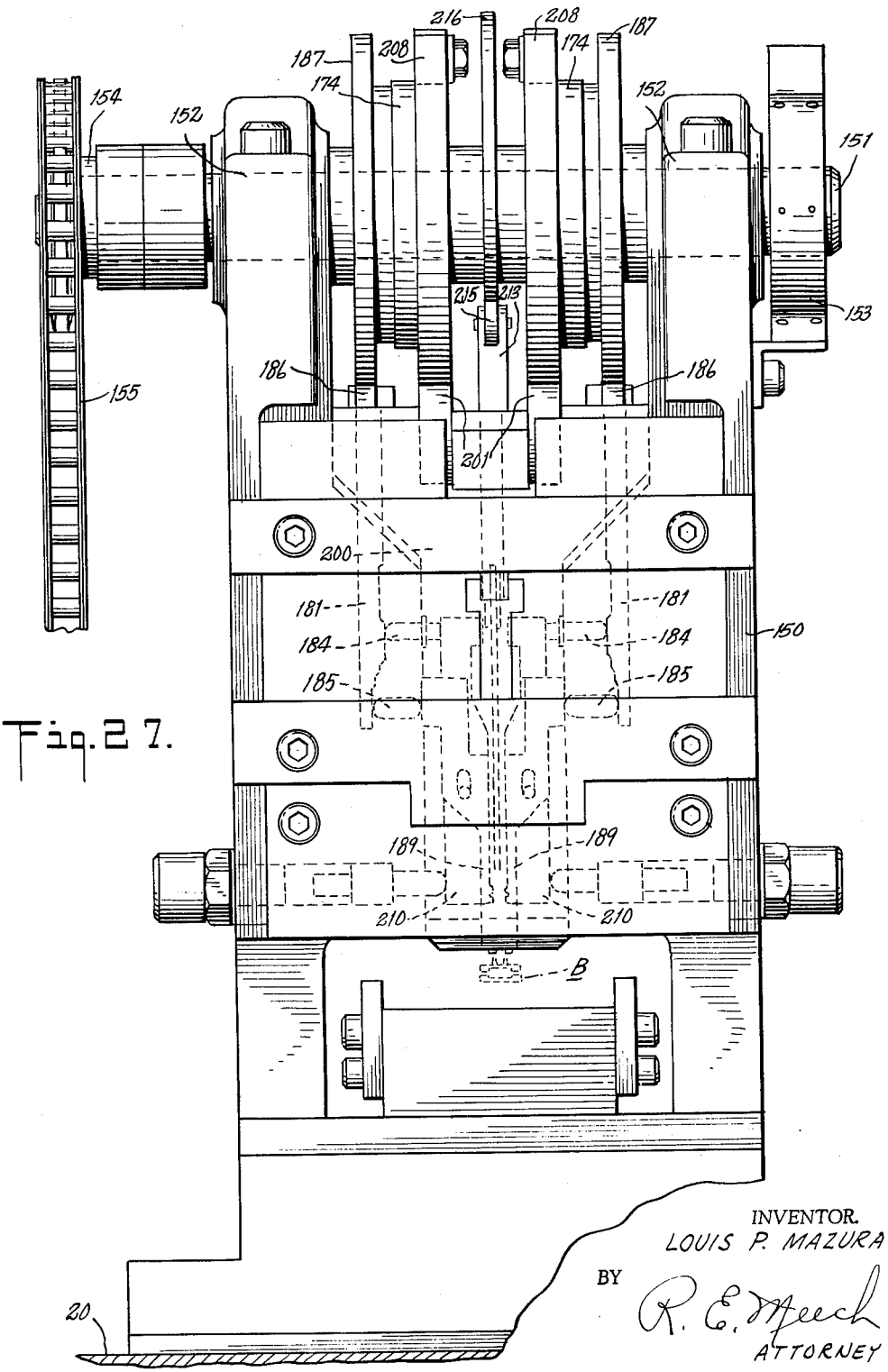
Figure 28:
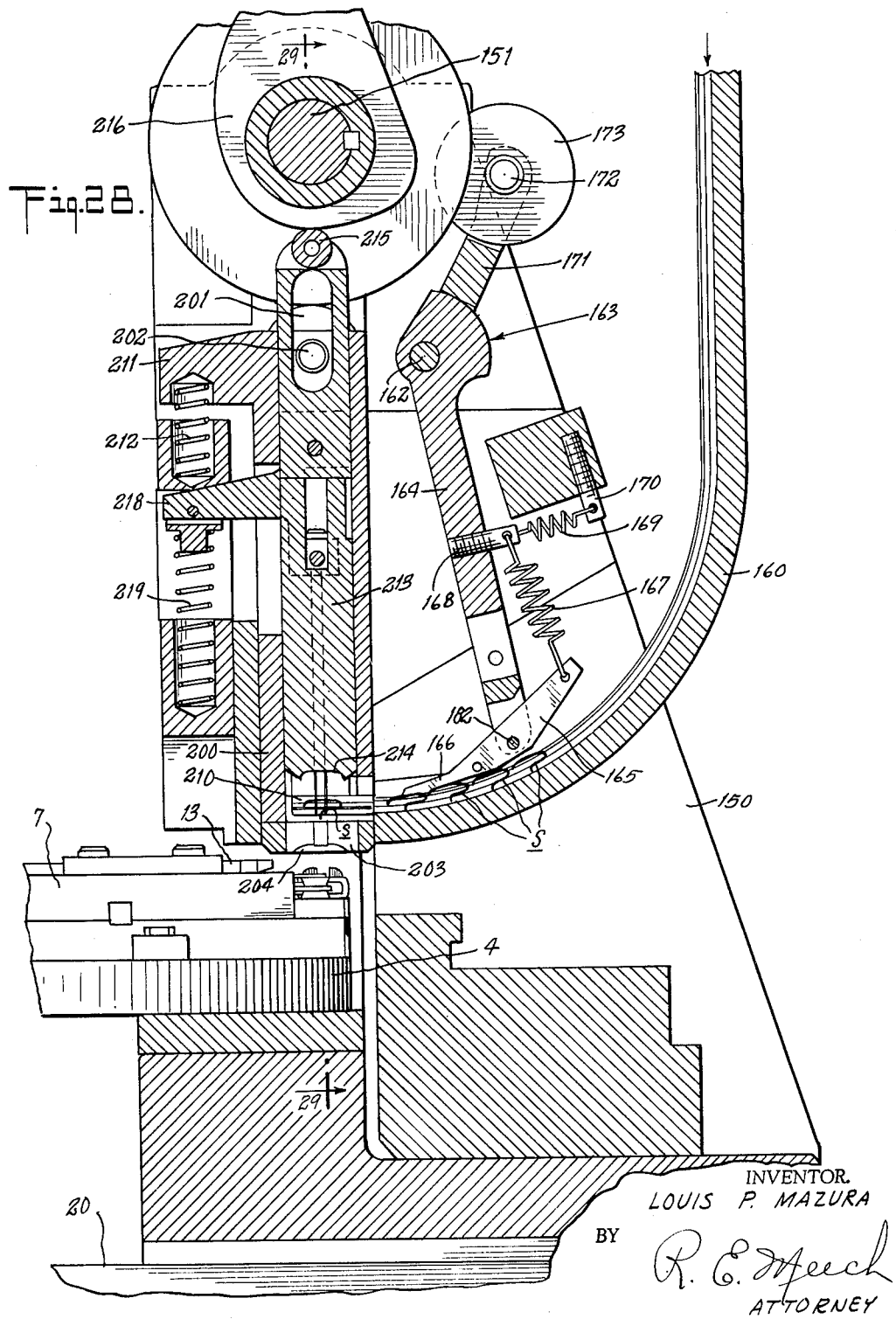
Figure 29:
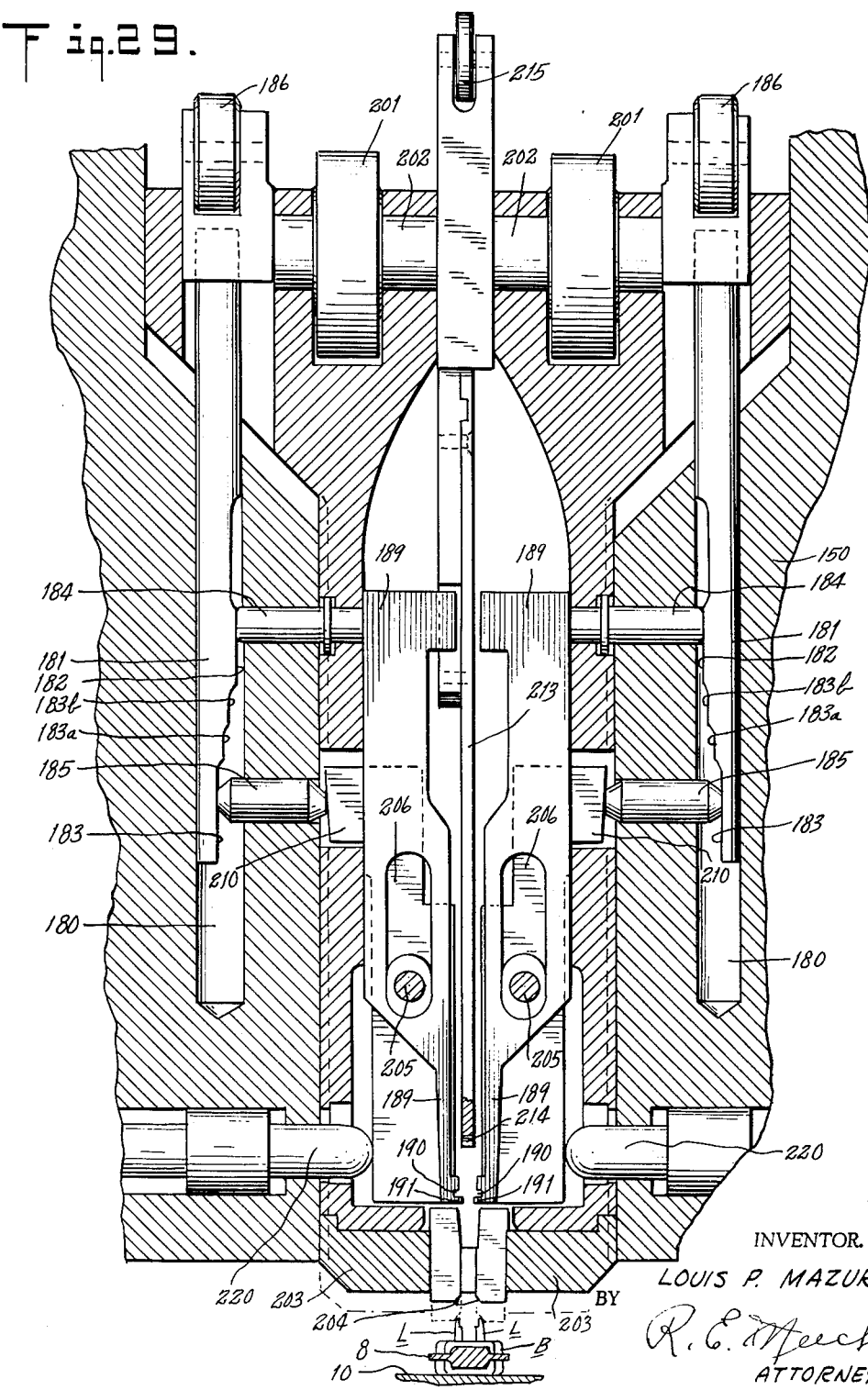
Figure 30:
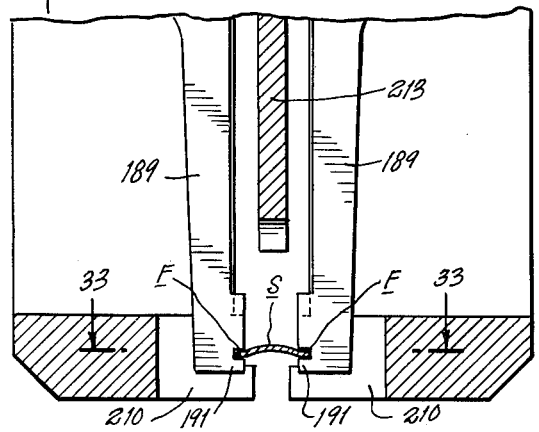
Figure 33:
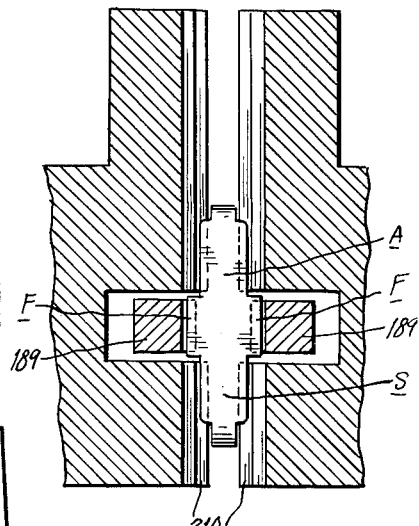
Figure 31:
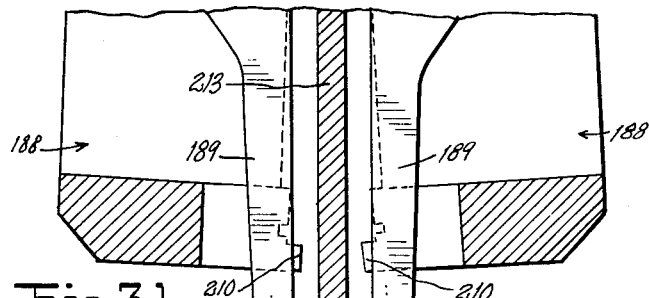
Figure 32:
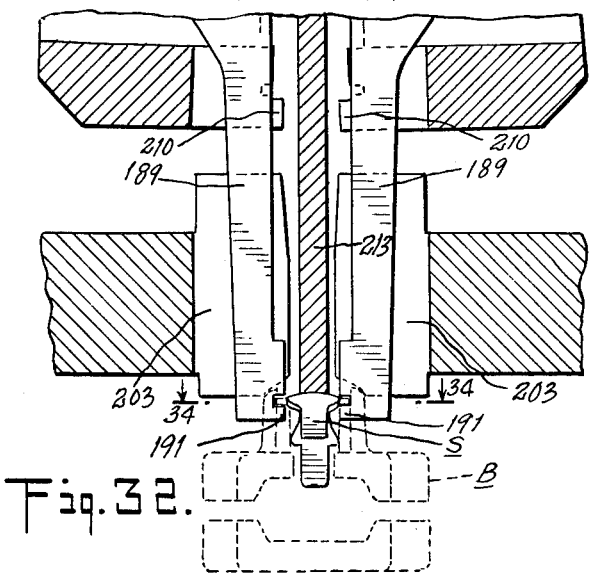
Figure 34:
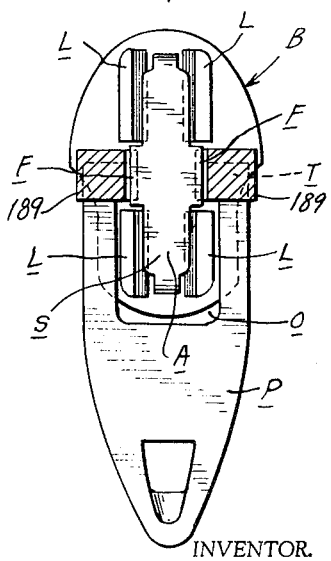
Figure 41:
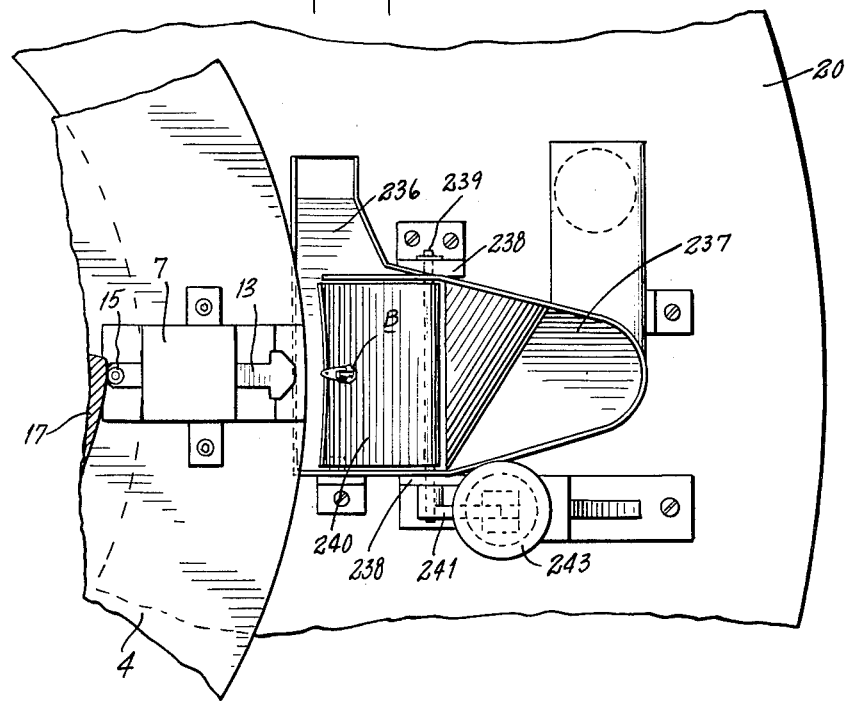
Figure 42:
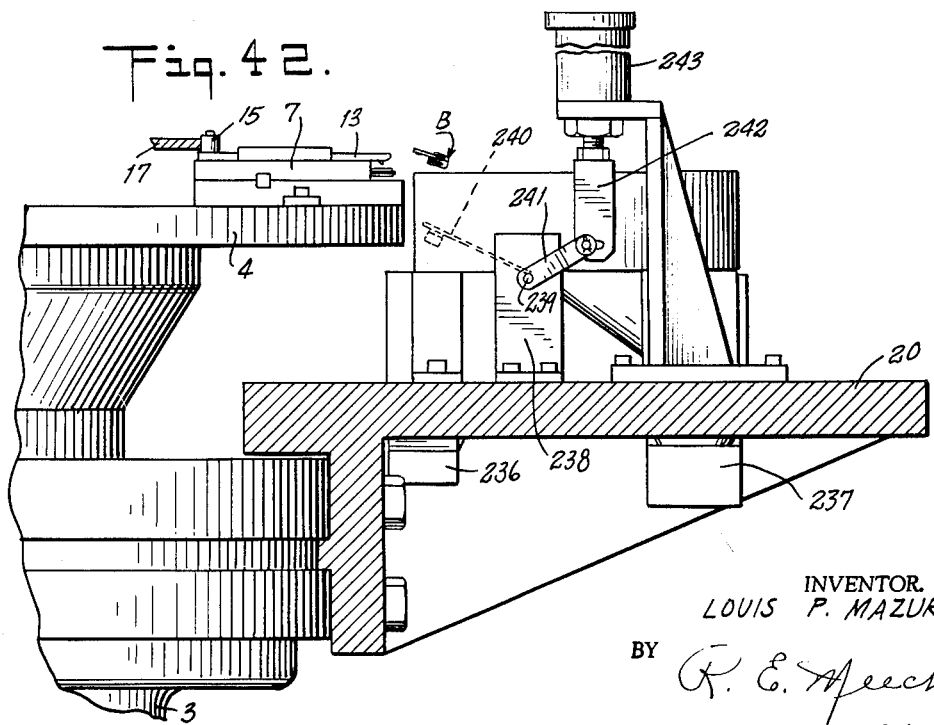

In these drawings:

FIG. 1 is a schematic plan view of the improved automatic lock slider assembly machine in accordance with the present invention, FIG. 2 is a plan view of a completely assembled automatic lock slider having the parts assembled by the machine of the present invention as shown in FIG. 1, FIG. 3 is a side view of the slider as shown in FIG. 2, FIG. 4 is an end view of the same, FIG. 5 is a plan view, partly broken away, of one of the slider body holding brackets or members, having a completely assembled slider positioned thereon, and showing the combined pull hold-down and ejecting member in its protracted position, FIG. 6 is a vertical sectional view through the combined pull hold-down and ejecting member as shown in FIG. 5, FIG. 7 is a vertical sectional view taken through one of the slider body holding members positioned at the ejecting station showing the combined pull hold-down and ejecting member in its protracted position ejecting a completely assembled slider from the slider body holding member, FIG. 8 is a sectional view taken on line 8—8 of FIG. 6, FIG. 9 is a side elevational view of the slider body loading mechanism showing the supporting means and drive therefor in cross section at the slider body loading station, FIG. 10 is a sectional view taken on line 10—10 of FIG. 9, FIG. 11 is a sectional view taken on line 11—11 of FIG. 9, FIG. 12 is a front elevational view of the machine of the present invention, FIG. 13 is an enlarged sectional view of the slider body loading unit for transferring the slider bodies from the chute to a slider body holding member, as shown in FIG. 9, FIG. 14 is an enlarged plan view of a slider body holding member, similar to FIG. 5, showing a slider body about to be positioned thereon at the slider body loading station, FIG. 15 is a side elevational view, partly in section, of the slider body detecting device, FIG. 16 is a sectional view taken on line 16—16 of FIG. 15, FIG. 17 is a sectional view taken on line 17—17 of FIG. 15, FIG. 18 is a side elevational view of the pull loading unit together with the drive therefor and the supporting means in section at the pull loading station, FIG. 19 is a sectional view taken on line 19—19 of FIG. 18, FIG. 20 is an enlarged sectional view taken on line 20—20 of FIG. 18, FIG. 21 is a vertical sectional view taken on line 21—21 of FIG. 20, FIG. 22 is an enlarged plan view of the lower end of the pull loading unit at the pull loading station, FIG. 23 is an enlarged side elevational view of the lower end of the pull loading unit showing a pull being positioned on a slider body in a slider body holding member, FIG. 24 is a side elevational view partly in section of the pull detecting device, FIG. 25 is an enlarged sectional view taken on line 25—25 of FIG. 24, FIG. 26 is a side elevational view of the spring loading unit together with the drive therefor at the spring loading and staking station, FIG. 27 is a first elevational view of the spring loading and staking unit as shown in FIG. 26, FIG. 28 is a vertical sectional view through the spring loading and staking unit as shown in FIG. 27, FIG. 29 is a sectional view taken on line 29—29 of FIG. 28, FIG. 30 is a vertical sectional view of the lower end of the spring loading and staking unit showing the opposed finger or side tools receiving and supporting a spring member with the side tools in their retracted position, FIG. 31 is a view similar to FIG. 30 showing the side tools together with the spring held therebetween moving toward their protracted position, FIG. 32 is also a view similar to FIGS. 30 and 31 showing the side tools in their fully protracted position so as to position a spring on the lugs of a slider body, FIG. 33 is a sectional view taken on line 33—33 of FIG. 30, FIG. 34 is a sectional view taken on line 34—34 of FIG. 32, FIG. 35 is a vertical sectional view of the rail and the side tools in the spring loading and staking unit showing a spring member positioned therein in readiness to be positioned on the slider body, with the side tools in their retracted position, FIG. 36 is a vertical sectional view similar to FIG. 35 showing the side tools in their protracted position and the positioning of a spring member on a slider body, FIG. 37 is a sectional view taken on line 37—37 of FIG. 35, FIG. 38 is a sectional view taken on line 38—38 of FIG. 36 showing the staking of the spring member to the lugs of the slider body, FIG. 39 is a plan view of the completely assembled slider detecting station, FIG. 40 is a side elevational view of the mechanism shown in FIG. 39, FIG. 41 is a plan view of the assembled slider ejecting station, and FIG. 42 is a side elevational view of the mechanism shown in FIG. 41.

General Description

Referring more particularly to the drawings, the assembly machine of the present invention is designed particularly for assembling the various parts of automatic lock sliders for slide fasteners of type shown in FIGS. 2, 3 and 4 of the drawings, but it will be understood that it may be used for assembling other similar types of lock sliders. Such a slider, as shown, consists of three parts, namely, a body member B having a pair of spaced-apart flanged wing portions W connected at one end by a neck portion N so as to provide a diverging channel C therebetween. On one of the wing portions W, there is provided two pairs of spaced-apart lug portions L so as to provide a laterally disposed space therebetween. There is provided a cap-like spring locking member S consisting of a relatively thin resilient sheet metal member bent upon itself so as to provide an attaching portion A having laterally extending opposed flange portions F and a locking prong D which extends through an opening in the wing into the channel C of the slider body. This locking member S is positioned on ledges of the lug portions L and staked thereto as at X. There is provided a pull member P having a transversely extending trunnion portion T at one end thereof so as to provide an opening O. This trunnion portion T is disposed in the space between the pair of lugs L between the locking member S and the outer side of the wing portion adjacent thereto. Such a slider is shown in the patent to Firing, No. 2,453,660, dated November 9, 1948.

The mechanism of the present invention for assembling automatic lock sliders for slide fasteners is shown incorporated with a conventional turret indexing unit sold commercially in the trade and which is well known to those skilled in the art. Accordingly, the driving and indexing mechanism will not be described in detail. Such a unit consists generally of a base 2 having housing 3 arranged thereon in which the driving and indexing mechanism is housed and which in turn has a turret or rotary annular plate-like member 4 mounted thereon which is adapted to be rotated intermittently so as to lock the turret positively and precisely at any one of a plurality of index positions or stations arranged therearound. Also, on top of the housing 3, there is arranged a stationary circular member 5 arranged axially of and concentric with the annular member 4. Extending outwardly from the side of the housing, there is provided an extension of an index cam shaft 6 that rotates one revolution with each index which provides positive means for actuating certain mechanical devices in accordance with the present invention which will now be described.

In accordance with the present invention, there is arranged on top of the annular plate-like member 4 and circumferentially therearound, a plurality of spaced-apart slider body holding members 7. As more clearly shown in FIGS. 5 through 8 and 14 of the drawings, there is arranged with each of these slider body holding members 7, a movable outwardly projecting finger-like member 8 which is fulcrumed intermediate the length thereof, at 9, on a plate member 10. The outer end of this finger-like member 8 is shaped so as to conform to the interior channel C of a slider body B which telescopically fits thereon and is supported thereby during the assembling of a spring locking member S and a pull member P on the slider body.

At the inner end of the finger-like member 8, there is arranged in the slider body holding member 7, a compression coil spring 12 for forcing the finger-like member 8 about its fulcrum at 9 whereby the outer end of the finger-like member 8 cooperates with the upper surface of plate member 10 to hold a slider body B securely in position on the end of the finger-like member.

On top of each of these slider body holding members 7, there is arranged between suitable guide plates, a reciprocable combined pull hold-down and ejecting member 13 having a downwardly extending hook-like portion 14 arranged adjacent the outer enlarged end thereof which is adapted to cooperate with the outer end of a pull member P both to hold it in position on the slider body and to eject a completely assembled slider from the machine in a manner hereinafter to be described.

On the inner end of each of these reciprocable members 13, there is arranged a cam roller or follower 15 which is adapted to cooperate with stationary cams 16, 17, 18 and 19 arranged circumferentially on and around the inner stationary circular member 5.

In the present illustration of the machine of the present invention, as shown in FIG. 1 of the drawings, there is shown sixteen index stations. In a counter-clockwise direction beginning at the bottom of the figure and continuing half way around the turret these stations, as indicated, are as follows: slider body loading, slider body detecting, pull loading, pull detecting, spring loading and staking, sorting detector, slider body ejector and chute, and check clear nest. It will be seen that these stations are repeated in the above order on around the other half the turret continuing in a counter-clockwise direction. That is to say, in the present instance there is shown two sets of like indexing stations for the purpose of efficiency with each set adapted to assemble a slider. In other words, two groups of sliders are completely assembled and ejected from the machine simultaneously. Consequently, only one of each of these loading and delivery units will be described.

Slider Body Loading Unit

Attention is now directed to FIGS. 9, 10 and 11 of the drawings, which shows one of the slider body loading units positioned at the first station around the periphery of the rotatable turret 4. There is provided a supporting bracket member 20 which is preferably attached to the outer side of the housing 3 of the machine. On this supporting member 20, there is arranged a bracket 21 which in turn supports a slider body delivery member 22. In the front side of this member 22, there is provided an arcuated chute member 23 with the lower end thereof terminating directly opposite the periphery of the turret 4 and opposite the path of the finger-like members 8 as they move therealong upon rotation of the turret. As more clearly shown in FIG. 11, at the upper end of this chute 23, there is pivotally arranged, as at 24, a trigger-like member 25 having a hook-shaped portion 26 arranged on one end thereof which extends into the chute at the upper end thereof. At the opposite end of this trigger-like member 25, there is provided a coil tension spring 26. At the upper end of this chute 23, there is provided a stop pin 27 having the outer tapered end thereof extending into the chute. Intermediate the length of this stop pin 27, there is arranged therearound, a coil spring 28 which maintains the pin in a protracted position.

On the outer end of a bracket arm 32 carried by the member 22, there is journaled, as at 33, a shaft 34 on which there is mounted an oscillating member 35 having a pair of diverging arm-like portions 36 and 37. On the outer end of the arm-like portion 36, there is arranged a finger-like member 38 which is pivoted thereto, as at 39, and having a spring 40 arranged therewith. Likewise on the outer end of the arm-like portion 37, there is arranged a similar finger-like member 42 which is pivoted thereto, as at 43, and has a spring 44 arranged therewith. It is the purpose of these springs 40 and 44 to maintain the inner ends of the respective finger-like members 38 and 42 in the chute 23, at all times, as more clearly shown in FIG. 13.

As shown in FIGS. 9 and 10, to one side of the oscillating member 35, there is mounted on the shaft 34, a bell-crank member 45 to which the one end of a link member 46 is pivotally attached, as at 47. The opposite end of this link member 46 is pivotally attached, as at 48, to the upper end of a lever 49. The lower end of this lever 48 is secured to the end of a shaft 50, journaled in the bracket member 21. There is provided a lever member 51 having one end secured to this shaft 50 with the opposite end pivotally attached, as at 52, to the upper end of a drive rod 53. There is provided a tension spring 54 having one end attached, as at 55, to the lever 48 and the opposite end attached, as at 56, to the base of the bracket 21.

On the under side of the supporting bracket 20, there is arranged a pair of downwardly extending guide rods 57 on which there is mounted a movable block member 58 in which the lower end of the drive rod 53 is seated, as at 59. There is carried by this block member 58, a cam roller or follower 60 which cooperates with a cam 61 arranged on a hollow shaft 62. Within this hollow shaft 62, there is securely arranged a stationary or dead shaft 63 having one end supported by the guide rods 57, as at 64, and the other end supported by the housing 3, as at 65. This hollow shaft 62 is driven by the driving mechanism within the housing 3 which is not shown.

At the upper end of the chute 23 in the slider delivery member 22, as shown in FIG. 11, there is arranged an inclined chute 66, the lower end of which communicates with the upper end of the chute 23. At the opposite end of this chute 66 and communicating therewith, there is arranged a conventional hopper 67 which is supported on the central stationary circular member 5 of the machine, as shown in FIG. 1 of the drawings.

This slider body loading unit functions in the following manner. The slider bodies B are delivered successively from the hopper 67 to the chute 66 in which they pass downwardly due to gravity until they successively contact the end of the trigger-like member 25 in the chute 23 where their further movement into and down the chute 23 is momentarily arrested, as more clearly shown in FIG. 11. The hook-like portion 26 will engage the neck portion N of the slider bodies B in such position.

The upper finger-like member 38 then moves the foremost slider body B from such arrested position downwardly into the chute 23 due to the rotation of the shaft 34 by the action of the member 35 and the bell-crank arrangement of the lever 46, 49, 51 and the rod 53 until it comes to rest on the roller 68 arranged intermediate the length of the arcuated chute 23. This lower finger-like member 42 will then move the slider body B on the next cycle of operation from its arrested position on the roller 68 and down the chute and from the end thereof onto the end of a finger-like member 8 of a slider holding body member 7, as shown in FIGS. 13 and 14 of the drawings.

Slider Body Detecting Station

The next station around the turret is the slider body detecting station which is shown more in detail in FIGS. 15, 16 and 17 of the drawings. At this station there is mounted on the supporting member 20, a bracket member 70 having a reciprocable positioning and detector member 71 carried thereby. The forward inner end of this member is beveled, as at 72, and it is the purpose of this member to contact the outer end of each slider body B as they pass therealong to position and seat the slider body firmly in position on the end of the finger-like member 8 and to detect the absence or displacement of a slider body on a finger-like member.

Intermediate the length of this detector member 71, there is arranged a vertical lever member 73 having the upper end thereof pivotally attached to the detector member as at 74. This lever member is pivotally attached to the bracket member 70 intermediate the length thereof, as at 75, and the lower end of this lever member is pivotally attached to the outer end of a plunger 76 of an air cylinder 77.

Adjacent the outer end of detector member 71, there is carried thereby, an upwardly extending contact member 78 with the extreme upper end thereof being disposed between a pair of electrical contacts 79 and 80. On the inner end of the bracket member 70, there is mounted a vertically extending arm-like bracket 81. On the inner side of this bracket 81 there is mounted a switch 82 having a vertical contact plunger 83 arranged therewith. On the bottom end of plunger 83, there is mounted a shoe-like detector member 84 which is adapted to contact the lugs L of the slider bodies B as they pass therealong, as more clearly shown in FIG. 17. It is the purpose of this shoe-like member 84 together with the plunger 83 and switch 82 to arrest the action of the pull loading unit which will hereafter be described.

Pull Loading Unit

The slider bodies are moved by the turret next to the pull loading station and the pull loading unit is shown in detail in FIGS. 18 through 23 of the drawings. This unit consists of a bracket member 90 mounted on the supporting member 20 having an arcuated chute 91 arranged on the front side thereof with the lower end terminating adjacent the periphery of the turret 4. At the lower end of this chute 91, there is arranged a pair of spaced-apart opposed block-like members 92, each of which is mounted on a leaf spring 93 attached to the sides of the chute. The front side of each of these block-like members is beveled, as at 94. In under these block-like members, there is arranged a pair of opposed stop members 95 which extend into the chute and with each of which there is arranged a leaf spring 96.

There is provided an arm-like member 97 having a nose-like portion 98 arranged on the lower outer end thereof which is adapted to be disposed in the opening of a pull P in the chute 23 to move it therealong in a manner to be described. On this arm-like member 97, there is arranged a transversely extending pin 99 which cooperates with the block-like member 92. There is provided a bell-crank 100 securely attached to a shaft 101 provided in the bracket 90. One arm of the bell-crank 100 is pivotally attached, as at 102, to the inner end of the arm-like member 97 and there is arranged therebetween a leaf spring 103. The other arm of this bell-crank 100 is pivotally attached, as at 104, to the upper end of a vertical lever 105. The opposite or lower end of this lever 105 is pivotally attached, as at 106, to the end of a horizontal lever 107, and the opposite end of this lever 107 is pivotally attached, as at 108, to the bracket 90. Intermediate the length of this lever 107 there is carried thereby, a stud member 109 around which is disposed a coil spring 110 in an opening 112 in the bracket 90, as more clearly shown in FIGS. 18 and 21. There is carried by the lever 107 intermediate the length thereof, a roller 113 which rests upon a clevis 114 arranged with the upper end of a vertical rod 115. On the lower end of this rod 115, there is arranged a cam roller 116 which cooperates with a cam 117 mounted on a rotatable shaft 118. This shaft 118 is journaled, as at 119, in hangar brackets 120 mounted on the under side of the supporting member 20. There is also mounted on this shaft 118, a sprocket 121 around which there is disposed a drive chain 122.

At the upper end of the arcuated chute 91 and which communicates therewith, there is mounted an inclined chute 123 which in turn communicates, at the opposite end thereof, with a conventional pull hopper 124 suitably mounted thereabove.

On the bracket member 90 there is mounted a reciprocable substantially L-shaped block member 125 having one end thereof pivotally attached thereto, as at 126, the outer end of a plunger 127 arranged in a solenoid 128. To the opposite end of this block member 125 there is attached a tension spring 129. The upper end 130 of one of the legs of this block member 125 is adapted to cooperate with the under side of the lever 107 of the pull attaching unit to arrest movement thereof in the event a slider body B is not positioned on the finger-like member 8 then positioned opposite the pull loading unit. The energization of this solenoid 128 is controlled by the slider body detector unit previously described. That is to say, pull loading unit will not function to deliver a pull from the chute 91 unless there is a slider body in position on the finger-like member to receive it.

This pull loading unit functions in the following manner. The pulls P pass from the hopper 124 and down the chute 123 and down into the chute 91 by the force of gravity. In the lower end of the chute 91 the pulls P are moved successively therefrom to superimposed position on the upper wing of a slider body B which has been previously indexed by the turret so as to be positioned opposite the pull loading unit. The pulls P are moved successively from the end of this chute 91 by means of the arm-like member 97 with the nose-like portion 98 thereon falling into position in the opening O in the pull. This arm-like member 97 is actuated by the bell-crank 100 and the levers 105 and 107 due to the action of the spring 110 which has been previously loaded by the action of the rod 115 and the cam 117 on the shaft 118.

In such outward movement of this arm-like member 97, the transverse pin 99 carried thereby enters between the pair of block members 92 forcing them apart, as clearly shown in FIG. 22, against the action of the leaf springs 93. Simultaneously the foremost pull P is moved out from the end of the chute 91 against the action of the stop members 95 and onto the slider body B so that the trunnion portion T of the pull member is positioned in the space between the two pairs of lugs L of the slider body, as shown in FIG. 3.

The arm-like member 97 is then returned to its retracted position in readiness to engage and deliver another pull from the chute for the next cycle, by the bell-crank 100, the levers 105 and 107, the rod 115 and the cam 117. During such movement it will be seen that the spring 110 is again loaded. After the transverse pin 99 has passed to position beyond the block members 92 it will be understood that they will again assume their normal positions, as shown in FIG. 20, due to the action of the springs 93. In such movement of this arm-like member 97 to its retracted position, the transverse pin 99 will ride or cam over the beveled surfaces 94 and over the block members 92 so as to lift the arm-like member 97 together with the nose-like portion 98 carried thereby out of the chute 91 so as not to disturb the pulls P in the lower end of the chute, as clearly shown in FIG. 21. After this arm-like member 97 has been moved to its fully retracted position, it will be forced downwards with the nose-like portion again positioned in the chute 91 and in an opening O in the next pull due to the action of the spring 103. This completes one cycle of operation of the pull loading unit.

It will be understood that at all times while the slider bodies B together with pulls P are being positioned on the respective finger-like members 8, the respective combined pull hold-down and ejecting members 13 are in their retracted position, as shown in FIG. 5. Immediately after the arm-like member 97 has moved to its retracted position, the turret 4 starts to rotate, and the cam 132 positioned on the inner stationary circular member 5, as shown in FIG. 1, cooperates with cam rollers 13 arranged on the inner ends of the combined pull hold-down and ejecting members 13 so as to move the same outwardly over the ends of the pulls P, as shown in FIGS. 5 and 6. These combined pull hold-down and ejecting members are maintained in such protracted position until a slider is completely assembled and ejected from the machine.

Pull Detecting Station

The next station around the turret is the pull detecting station which is shown more in detail in FIGS. 24 and 25 of the drawings. At this station there is mounted on the supporting member 20, a bracket 140 having an inwardly extending arm-like member 141 pivotally attached thereto, as at 142, and under which there is arranged a leaf spring 143, preferably made of fiber or some other suitable insulating material. On the lower side of this arm-like member 141, there is mounted a downwardly extending finger-like detector member 144 which is adapted to contact the upper side of the pulls as they pass therealong on the slider bodies. This finger-like member is attached to an electrical connection 145. It is the purpose of this detector to arrest the action of the spring loading unit to deliver a spring S to the slider in the event a pull P is not positioned thereon which spring loading unit will hereinafter be described. This detector controls the aciton of a clutch mechanism (not shown) arranged with the shaft 157 so as to prevent actuation of the spring loading unit in case a pull P is not in position on the slider body B.

Spring Loading Station

Now the next and probably the most important station around the turret is the spring loading and attaching station, as more clearly shown in FIGS. 26 through 34 of the drawings.

This spring loading unit consists of a bracket member 150 mounted on the supporting member 20, as more clearly shown in FIGS. 26, 27 and 28, having a transverse rotatable shaft 151 journaled, as at 152, in the upper end thereof. On one end of this shaft, there is arranged a friction brake 153 and on the opposite end there is mounted a sprocket 154 having a drive-chain 155 arranged therearound. In the lower end of a hangar bracket 156 mounted on the underside of the supporting member 20, there is arranged a rotatable shaft 157 having a sprocket 158 mounted thereon over which the chain 155 is also disposed. There is also arranged on this shaft 157, another sprocket 158-a around which another drive chain 159 is arranged.

Centrally of this bracket member 150, there is mounted thereon an arcuated chute 160. The upper end of this chute 160 communicates with a spring hopper 161 suitably mounted thereabove, as shown in FIG. 1, from which the springs S pass down the chute 160 by the force of gravity.

Above this chute 160 there is arranged on the bracket member 150, a transverse shaft 162 having a yoke-like bell-crank member 163 mounted thereon. On the lower end of the arm-like portion 164 of this bell-crank, there is pivotally attached thereto, as at 182, a finger-like member 165, the inner end 166 of which is normally positioned in the chute 160, as more clearly shown in FIG. 28. The outer end of this finger-like member 165 is connected to one end of a tension coil spring 167 and the opposite end of the spring is connected to a stud member 168 carried by the arm-like portion 164. One end of another tension coil spring 169 is also attached to this stud member 168 with the opposite end of this spring attached to another stud member 170 mounted on the bracket member 150. In the upper end of each of the arm-like portions 171 of the bell-crank 163, there is arranged a shaft 172 on which there is mounted a cam roller 173 which cooperates with cams 174 arranged on the transverse shaft 151.

Centrally of this bracket member 150, there is arranged a ram 200 having a pair of cam rollers 201 arranged on dowels 202 at the upper end thereof which cam rollers cooperate with cams 208 mounted on the shaft 151. In the lower end of this ram 200, there is arranged a pair of opposed movable side tools 203 having beveled upsetting surfaces 204. These side tools 203 are pivoted to pins 205 arranged in slotted openings 206 in the vertical members 188, and have outwardly projecting cam portions 207 arranged on the upper ends thereof, as more clearly shown in FIG. 29 of the drawings.

Within this bracket member 150, as more clearly shown in FIGS. 27 and 29, there is arranged in a pair of vertical slots 180, a pair of elongated vertical reciprocable cam members 181 having cam surfaces 182, 182a, and 183, 183a, and 183b which are adapted to cooperate with transverse pins 184 and 185, respectively, reciprocally arranged in openings in the bracket 150. On the upper end of each of these cam members 181, there is mounted a cam roller 186 which cooperate with cams 187 mounted on the transverse shaft 151.

In an opening centrally of the ram 200, there is mounted in suitable guideways therein, a pair of elongated opposed vertical reciprocable arm-like members 188 with each having a finger-like portion 189 arranged on the lower end thereof. In opposed sides at the lower end of each of these finger-like portions 189, there is arranged a slot 190, so as to provide a pair of opposed shoulders 191.

Also, within this ram 200, there is arranged a pair of opposed movable guide rails 210 for receiving and holding a spring S as it is delivered from the end of the chute 160 into position in the ram, as shown in FIG. 28. There is carried by this ram 200, an outwardly extending arm 211 which cooperates with a return compression coil spring 212 positioned in an opening in the bracket 150.

Centrally and within the ram 200 and between the two opposed vertical members 188, there is arranged an elongated vertical spring-hold-down member 213 preferably having an arcuated lower end portion, as at 214. On the upper end of this member 213, there is arranged a cam roller 215 which cooperates with a cam 216 arranged on the transverse shaft 151. At the upper end of this member 213, there is arranged therein, a slotted opening 217 into and through which the dowels 202 extend. There is also carried by this member 213, an outwardly extending arm 218 which cooperates with a return compression coil spring 219 arranged in an opening in the bracket 150 below the spring 212.

At the bottom of the bracket 150, there is arranged a pair of opposed spring plunger pins 220, which cooperate with outer sides of the rails 210, as shown in FIG. 29.

This spring loading and attaching unit functions in the following manner. The springs S pass successively from the hopper 161 and down the chute 160 by the force of gravity, as shown in FIG. 28 of the drawings. At the bottom of this chute 160 they are moved successively therefrom onto the opposed movable guide rails 210 within the ram 200 by the finger-like member 165 which is actuated by the bell-crank arrangement 163, the cam rollers 173 and the cooperating cams 174 on the shaft 151.

A spring S will now be assumed to be in position on the rails 210 in the ram 200 and in readiness to be transferred to position on the lugs L of a slider body B positioned on the turret therebelow. In such position, it will be understood that the spring is not only supported by the rails 210, but also by the shoulders 191 of the finger-like portions 189 carried by the vertical members 188. These shoulders 191 support the spring S at the lateral flange portions F of the spring positioned centrally of the attaching portion A of the spring.

The ram is now moved downwardly until the lower opposed beveled surfaces 204 of the opposed upsetting tools 203 rest upon the upper edges of the lugs L of the slider body, as shown in FIG. 29, due to the action of the cam rollers 201 and the cooperating cams 208 on the shaft 151.

Immediately thereafter, the opposed guide rails 210 move apart from one another so that the spring S is held in suspended position solely by the shoulders 191 of the finger-like members 189. Shortly thereafter the vertical member 213 moves downwardly into abutting relation with the attaching portion A of the spring S so to aid in holding the spring in position, as shown in FIG. 31.

The vertical members 188 which are carried by the ram 200 together with vertical member 213 positioned therebetween continue to move downwardly until the spring S is positioned on the lugs L of the slider body B, as shown in FIGS. 32 and 36. While in this position the upsetting tool 203 attached to the lower end of the ram 200 is actuated by cam 208 on shaft 151 so that the working surfaces 204 thereof strike the upper portions of the lugs L of the pairs of the slider body thereby bending these upper portions over the edges of the attaching portion A of the spring S so as to stake the spring S to the lugs L, as at X.

The vertical members 188 are then actuated by the cam surfaces 182, 183 and the pin 185 so as to move apart from one another and release the spring S. The ram 200 together with the vertical members 188 carried thereby and the member 213 then move to their retracted position in readiness for assembling the next spring on another slider body.

*Sorting Detector and Slider Ejecting Unit*

Around the turret 4 beyond the spring loading unit, as shown in FIGS. 1, 29 and 40, there is mounted in the supporting member 20, a bracket 230 on which there is pivotally mounted, as at 231, an arm-like member 232. On the outer end of this arm-like member 232, there is arranged a finger-like feeler member 233 which is adapted to contact the top of a spring S of an assembled slider. Below the opposite or inner end of this arm-like member 232, there is arranged a micro-switch 234 which cooperates therewith and which is mounted on a bracket 235 carried by the bracket 230. It is the purpose of this micro-switch to control the actuation of certain relays (not shown) for actuating the sorting unit which will now be described.

Directly next to this detector, as shown in FIGS. 41 and 42, there is arranged a pair of chutes 236 and 237, the chute 236 being adapted to receive a rejected or defective assembled slider or product and the chute 237 being adapted to receive a correctly assembled slider or product. On the supporting member 20, there is arranged a pair of spaced-apart bracket members 238 between which there is arranged a shaft 239. There is secured to this shaft 239, a movable deflecting member 240 for receiving the correctly assembled sliders and deflecting them into the chute 237.

On one end of this shaft 239, there is securely attached thereto, one end of a lever 241 with the opposite end thereof pivotally attached to the outer end of a plunger 242 of an air cylinder 243.

This combined sorting detector and ejecting unit functions in the following manner. As the turret 4 is rotated after a spring S has been presumably assembled on and staked to a slider body B and the slider is presumably completely assembled with a spring S thereon, the spring S will contact feeler member 233 on the outer end of the arm-like member 232 thereby rotating the same about its pivotal connection at 231 thereby actuating the micro-switch 234. This assembled slider is then moved by the turret into position opposite the sorting unit. At this point the cam roller 15 of the ejecting member 13 will contact the stationary cam 19 thereby moving the assembled slider off the end of the finger-like member 8 due to the hook portion 14 contacting the outer end of the pull member P, as shown in FIGS. 6 and 7 of the drawings so as to eject the slider from the machine. It will be assumed that a spring S is in its proper position on the slider body and that the slider is completely assembled. The assembled slider will then pass from the end of the finger-like member 8 over the deflecting member 240 and down the chute 237 to a container positioned therebelow.

Now in the event a spring S is not positioned on the lugs L of the slider body B, obviously, there will be no spring present thereon to contact the feeler member 233 of the arm-like member 232 thereby leaving it at rest as the slider body passes therealong so as not to actuate the micro-switch 234. Consequently, as this slider body is moved to position opposite the sorting station, the air cylinder 243 will be actuated so as to move the plunger 242 thereof downwardly thereby rotating the shaft 239, and moving the deflecting member or door 240 to its upward position, as shown in the broken lines of FIG. 40 of the drawings, so as to permit such incorrectly assembled sliders to pass down the chute 236 into a container positioned therebelow. As the turret continues to be rotated, the ejecting member is then moved to its retracted position by the stationary cam 16 in readiness for the finger-like member to receive the next slider body at the starting point.

This completes one cycle of operation of the machine and a finger-like member 8 is then reloaded with another slider body for the assembly operation thereon so as to position the same at the various stations as above described.

It will be understood that the actuation of the slider body loading unit, the pull loading unit and the spring loading and attaching unit are all in timed relation. That is to say, a slider body B is positioned on a finger-like member 8, a pull P is positioned on a slider body and a spring S is positioned on and attached to a slider body at the respective stations all simultaneously.

As a result of my invention, it will be seen that there is provided an improved machine for assembling the parts of an automatic lock slider, namely, the pull member and the spring on a slider body which is fully automatic and a machine which assembles such sliders at a relatively rapid rate of speed thereby resulting in a great saving in the manufacture and assembly of such lock sliders which is extremely advantageous.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. In a machine for assembling lock sliders for slide fasteners,
    a supporting member,
    a circular plate-like member arranged on said supporting member for rotation relative thereto,
    a plurality of spaced-apart means arranged circumferentially around and on said circular member for receiving and holding a slider body,
    a plurality of assembling stations arranged around the periphery of said circular member,
    means arranged at a first station for delivering a slider body successively to each of said slider body holding means as they pass therealong,
    means arranged at succeeding stations for delivering and positioning a slider component part on each of said slider bodies as they pass therealong,
    means arranged opposite the periphery of said circular member after each assembly station therearound for detecting the presence or absence of a component part on each of said slider body holding members and slider bodies thereon as they pass therealong for controlling the actuation of the next succeeding assembly operation around the periphery of said circular member,
    means arranged opposite the periphery of said circular member for ejecting the completely assembled sliders from each of said slider body holding means after the component parts have been positioned thereon and attached thereto,
    and means carried by said supporting member for intermittently rotating said circular member so as to position the slider holding means successively opposite each of said stations.

2. The combination as defined in claim 1, including
    a hopper and chute arrangement positioned opposite the periphery of said circular member for delivering slider bodies successively to the slider body holding means on said circular member at the first station,
    another hopper and chute arrangement positioned opposite the periphery of said circular member for delivering pull members successively in superimposed position on the slider bodies at another station,
    and still another hopper and chute arrangement positioned opposite the periphery of said circular member for delivering cap-like members in superimposed position on the slider bodies and respective pull members thereon at still another station.

3. The combination as defined in claim 2, including means arranged opposite said last station for receiving, positioning and attaching a cap-like member to each of said slider bodies as they pass therealong.

4. The combination as defined in claim 2, including
    a cap-like member receiving means arranged at said last station,
    a pair of opposed movable members for holding cooperatively a cap-like member therebetween in said receiving means,
    means for moving the pair of opposed members toward one another so as to grip and hold the cap-like member therebetween and to position the same on a slider body in each of said slider body holding means as they pass therealong,
    and means for securely attaching the cap-like member to the slider body.

5. In a machine for assembling lock sliders for slide fasteners,
- a supporting member,
- a circular plate-like member arranged on said supporting member for rotation relative thereto,
- a plurality of spaced-apart slider body holding members circumferentially arranged around and on said circular member,
- means arranged with each of said slider body holding members for releasably holding a slider body thereon,
- supporting means mounted on said supporting member and arranged around the periphery of said circular member,
- means arranged on said supporting means opposite the periphery of said circular member for delivering slider bodies successively to said slider body holding members at a first station as they pass therealong,
- means arranged on said supporting means opposite the periphery of said circular member for delivering a pull member successively to each of the slider bodies on said slider body holding members in superimposed relation at a second station as they pass therealong,
- means arranged on said supporting means opposite the periphery of said circular member for delivering a cap-like member successively to each of said slider bodies so as to be superimposed on the slider bodies and said pull member at a third station as they pass therealong,
- means arranged on said supporting means opposite the periphery of said circular member at said last mentioned station for securing the cap-like members to the respective slider bodies together with the pull member so as to completely assemble the lock slider,
- means arranged on said supporting member for ejecting the completely assembled sliders from said slider holding members as they pass therealong,
- and means carried by said supporting member for intermittently rotating said circular member so as to position the slider holding members successively opposite each of said stations.

6. The combination as defined in claim 5, including
- a hopper and chute arrangement mounted on said supporting means opposite the periphery of said circular member for delivering slider bodies successively to the slider body holding members on said circular member at the first station as they pass therealong,
- another hopper and chute arrangement mounted on said supporting means opposite the periphery of said circular member for delivering pull members successively in superimposed position on the slider bodies at the second station as they pass therealong,
- and still another hopper and chute arrangement mounted on said supporting means opposite the periphery of said circular member for delivering cap-like members in superimposed position on the slider bodies and respective pull members thereon and for attaching them thereto at the third station as they pass therealong.

7. The combination as defined in claim 5, including
- a cap-like member receiving means arranged on said supporting means at said third station,
- a pair of opposed movable members arranged with said last means for holding cooperatively a spring member therebetween in said receiving means,
- means arranged with said last means for moving the pair of opposed members toward one another so as to grip and hold the cap-like member therebetween and to position the same on a slider body in said slider body holding member as they pass therealong,
- and means arranged with said last means and cooperating therewith for securely attaching the cap-like member to the slider body.

8. The combination as defined in claim 5, including
- an outwardly projecting member arranged with each of said slider body holding members which is adapted to extend into the channel of a slider body for holding the same,
- and a reciprocable combined pull hold-down and slider ejecting member arranged with each of said slider body holding members above said outwardly projecting member,
- and means carried by said supporting member for actuating said last mentioned member.

9. The combination as defined in claim 8, including stationary cam means arranged inwardly of the slider body holding members and within the rotary circular plate-like member for actuating each of said combined pull hold-down and ejecting reciprocable members as they pass therealong when the circular member is rotated.

10. The combination as defined in claim 5, including
- a bracket member arranged on said supporting means at said third station having a housing carried thereby,
- a pair of movable rails arranged within said housing for receiving a spring member from the delivery means,
- a pair of opposed side tools reciprocally mounted with said housing for gripping the sides of the cap-like member so as to hold the same,
- a reciprocable anvil-like member arranged within said housing for moving the cap-like member from said rails to a superimposed position on a slider body,
- and a rotatable shaft journaled in said bracket member having a plurality of cams arranged thereon for actuating said anvil and said side tools.

11. The combination as defined in claim 10, including
- an oscillating lever-like member journaled to said bracket intermediate the length thereof,
- a finger-like member arranged on one end of said lever-like member extending into the lower end of said chute for moving the cap-like members successively from the end of said chute to position on the pair of opposed rails in said housing,
- and at least one cam roller arranged on the opposite end of lever-like member which cooperates with a cam arranged on said shaft.

12. In a machine for assembling lock sliders for slide fasteners,
- a supporting member,
- a circular plate-like member arranged on said supporting member for rotation relative thereto,
- a plurality of spaced-apart slider body holding members arranged circumferentially on and around said circular member,
- an outwardly projecting member arranged with each of said holding members which is adapted to extend into the channel of a slider body for supporting the same,
- supporting means mounted on said supporting member and arranged around the periphery of said circular member,
- a plurality of assembly stations arranged on said supporting means opposite the periphery of said circular member and being spaced-apart circumferentially therearound,
- means for rotating the circular member intermittently so as to position the slider body holding members successively at each of said stations,
- a first chute arranged on said supporting means at a first assembly station for delivering slider bodies successively to said slider body holding members as they pass therealong,
- an oscillating finger-like member arranged with said first chute and extending thereinto for moving the slider bodies therefrom onto said projecting members of each of said slider body holding members as they pass therealong,
- a second chute arranged on said supporting means at a second assembly station for delivering pull members successively to said slider bodies,
- an oscillating finger-like member arranged with said second chute and extending thereinto for moving the pull members therefrom to superimposed position on the slider bodies as they pass therealong, a third chute arranged on said supporting means at a third assembly station for delivering spring members successively to said slider bodies, an oscillating finger-like member arranged with said third chute and extending thereinto for moving the spring members therefrom to superimposed position onto said slider bodies and said pull members as they pass therealong, and means carried by the supporting member for actuating each of said finger-like members together with circular rotating member in timed relation.

13. The combination as defined in claim 12, including a reciprocable combined pull hold-down and slider ejecting member arranged with each slider body holding member above said outwardly projecting member.

14. The combination as defined in claim 13, including stationary cam means arranged on said supporting member inwardly of the slider body holding members and within the rotary circular plate-like member for actuating each of said combined pull hold-down and ejecting reciprocable members as they pass therealong when the circular member is rotated.

15. The combination as defined in claim 12, including means arranged on said supporting means opposite said third station for receiving, positioning and attaching a spring member in superimposed position on each of said slider bodies as they pass therealong.

16. The combination as defined in claim 12, including a spring member receiving means arranged on said supporting means at said third station, a pair of opposed movable members arranged with said means for holding cooperatively a spring member therebetween in said receiving means, means for moving the pair of opposed members toward one another so as to grip and hold the spring member therebetween and to position the same on a slider body in said slider body holding member as they pass therealong, and means arranged with said last mentioned means for securely attaching the spring member to the slider body.

17. The combination as defined in claim 12, including a bracket member arranged on said supporting means at said third station having a housing carried thereby, a pair of movable rails arranged with said said housing for receiving a spring member from said chute, a pair of opposed side tools reciprocally mounted with said housing for gripping the sides of the spring member so as to hold the same, a reciprocable anvil-like member arranged within said housing for moving the spring member from said rails to a superimposed position on a slider body, and a rotatable shaft journaled in said bracket member having a plurality of cams arranged thereon for actuating said anvil and said side tools.

18. The combination as defined in claim 17, including an oscillating lever-like member journaled to said bracket intermediate the length thereof, a finger-like member arranged on one end of said lever-like member extending into the lower end of said chute for moving the spring members successively from the end of said chute to a position on the pair of opposed rails in said housing, and at least one cam roller arranged on the opposite end of lever-like member which cooperates with a cam arranged on said shaft.

19. In a machine for assembling lock sliders for slide fasteners, a supporting member, an annular plate-like member arranged on said supporting member for rotation relative thereto, a plurality of spaced-apart slider body holding members arranged circumferentially on and around said annular member, an outwardly projecting member arranged with each of said holding members which is adapted to extend into the channel of a slider body for supporting the same, supporting means mounted on said supporting member and arranged around the periphery of said annular member, a reciprocable combined pull hold-down and slider ejecting member arranged with each slider body holding member above said outwardly projecting member, stationary cam means arranged on said supporting member inwardly of said slider body holding members and within the rotary annular plate-like member for actuating each of said combined pull hold-down and ejecting reciprocable members as they pass therealong when the annular member is rotated, a plurality of assembly stations arranged on said supporting means opposite the periphery of said circular member and being spaced-apart circumferentially therearound, means for rotating the annular member intermittently so as to position the slider body holding members successively at each of said stations, a first chute arranged on said supporting means at a first assembly station for delivering slider bodies successively to said slider body holding members as they pass therealong, a second chute arranged on said supporting means at a second assembly station for delivering pull members successively to said slider bodies as they pass therealong, an oscillating finger-like member arranged with said second chute extending thereinto for moving the pull members therefrom to superimposed position on the slider bodies as they pass therealong, a third chute arranged on said supporting means at a third assembly station for delivering spring members successively to said slider bodies as they pass therealong, means arranged on said supporting means opposite said third station for receiving a spring member from said chute and positioning and attaching the same in superimposed position on each of said slider bodies as they pass therealong, an oscillating finger-like member arranged with said third chute extending thereinto for moving the spring members therefrom to said last mentioned means, and means carried by said supporting member for actuating each of said finger-like members together with annular rotating member in timed relation.

20. The combination as defined in claim 19, including a bracket member arranged on said supporting means at said third station having a housing carried thereby, a pair of movable rails arranged within said housing for receiving a spring member from said chute, a pair of opposed side tools reciprocally mounted with said housing for gripping the sides of the spring member so as to hold the same, a reciprocable anvil-like member arranged within said housing for moving the spring member from said rails to a superimposed position on a slider body, and a rotatable shaft journaled in said bracket member having a plurality of cams arranged thereon for actuating said anvil and said side tools.

21. The combination as defined in claim 20, including an oscillating lever-like member journaled to said bracket intermediate the length thereof, a finger-like member arranged on one end of said lever-like member extending into the lower end of said chute for moving the spring members successively from the end of said chute to a position on the pair of opposed rails in said housing, and at least one cam roller arranged on the opposite end of lever-like member which cooperates with a cam arranged on said shaft.

22. In combination with a turret indexing unit including a base and a rotary annular plate-like top arranged thereon and drive means arranged within the base for intermittently rotating and arresting rotary movement of said annular member at a plurality of index positions arranged therearound, a plurality of spaced-apart slider body holding members arranged circumferentially on and around said annular member, an outwardly projecting member arranged with each of said holding members which is adapted to extend into the channel of a slider body for supporting the same, supporting means mounted on said supporting member and arranged around the periphery of said annular member, a reciprocable combined pull hold-down and slider ejecting member arranged with each slider body holding member above said outwardly projecting member, stationary cam means arranged on said base inwardly of said slider body holding members and within the rotary annular plate-like member for actuating each of said combined pull hold-down and ejecting reciprocable members as they pass therealong when the annular member is rotated, a plurality of index positions arranged on said supporting means around and opposite the periphery of said circular member and being spaced-apart circumferentially therearound, a first hopper and chute arrangement mounted on said supporting means at a first index position for delivering slider bodies successively to said slider body holding members as they pass therealong, an oscillating finger-like member arranged with said first chute extending thereinto for moving the slider bodies therefrom onto said projecting members of each of said slider body holding members as they pass therealong, a second hopper and chute arrangement mounted on said supporting means at a second index position for delivering pull members successively to said slider bodies as they pass therealong, an oscillating finger-like member arranged with said second chute extending thereinto for moving the pull members therefrom to superimposed position on the slider bodies as they pass therealong, a third hopper and chute arrangement mounted on said supporting means at a third index position for delivering spring members successively to said slider bodies as they pass therealong, means arranged on said supporting means opposite said third index position for receiving a spring member from said chute and positioning and attaching the same in superimposed position on each of said slider bodies as they pass therealong, an oscillating finger-like member arranged with said third chute extending thereinto for moving the spring members therefrom to said last mentioned means, and means carried by said supporting member for actuating each of said finger-like members together with the indexing of the annular rotating member in timed relation.

23. The combination as defined in claim 22, including a bracket member arranged on said supporting means at said third index position having a housing carried thereby, a pair of movable rails arranged within said housing for receiving a spring member from said chute, a pair of opposed side tools reciprocally mounted with said housing for gripping the sides of the spring member so as to hold the same, a reciprocable anvil-like member arranged within said housing for moving the spring member from said rails to a superimposed position on a slider body, and a rotatable shaft journaled in said bracket member having a plurality of cams arranged thereon for actuating said anvil and said side tools.

24. The combination as defined in claim 23, including an oscillating lever-like member journaled to said bracket intermediate the length thereof, a finger-like member arranged on one end of said lever-like member extending into the lower end of said chute for moving the spring members successively from the end of said chute to a position on the pair of opposed rails in said housing, and at least one cam roller arranged on the opposite end of lever-like member which cooperates with a cam arranged on said shaft.

25. The combination as defined in claim 22, including slider body detecting means arranged on said supporting means after the first index position around the rotary annular plate-like top, pull detecting means arranged on said supporting means after the second index position, and another detector means arranged on said supporting means after the third index position.

26. In a machine for assembling lock sliders for slide fasteners, a supporting member, a circular plate-like member arranged on said supporting member for rotation relative thereto, a plurality of spaced-apart slider body holding members circumferentially arranged around and on said circular member, means arranged with each of said slider body holding members for releasably holding a slider body thereon, supporting means mounted on said supporting member and arranged around the periphery of said circular member, a plurality of spaced-apart component part assembly stations arranged on said supporting means around the periphery of said circular member, means arranged on said supporting means opposite the periphery of said circular member for delivering slider bodies successively to each of said slider body holding members at a first station as they pass therealong, means arranged on said supporting means opposite the periphery of said circular member for delivering a pull member successively to each of the slider bodies on said slider body holding members in superimposed relation at another station as they pass therealong, means arranged on said supporting means opposite the periphery of said circular member after said slider body station for detecting the presence or absence of a slider body on each of said slider holding members as they pass therealong for controlling the actuation of said pull loading means, means arranged on said supporting means opposite the periphery of said circular member for delivering a cap-like member successively to each of said slider bodies so as to be superimposed on the slider bodies and said pull member at another station as they pass therealong, means arranged on said supporting means opposite the periphery of said circular member at said last mentioned station for securing the cap-like members to the respective slider bodies together with the pull member so as to completely assemble the lock slider, means arranged on said supporting means opposite the periphery of said circular member after said pull loading station for detecting the presence or absence of a pull member on each of said slider bodies as they pass therealong for controlling the actuation of said cap-like loading means, means arranged on said supporting member for ejecting the completely assembled sliders from said slider holding members as they pass therealong, and means carried by said supporting member for intermittently rotating said circular member so as to position the slider holding members successively opposite each of said stations.

27. The combination as defined in claim 26, including means arranged with said ejecting means for detecting the presence of defective assembled sliders on each of said slider body holding members as they pass therealong and for sorting the defective assembled sliders from those that are correctly assembled and ejecting both the defective and correctly assembled sliders from the machine into separate channels.

References Cited in the file of this patent

UNITED STATES PATENTS

| | | |
|---|---|---|
| 2,155,958 | Schmidt | Apr. 25, 1939 |
| 2,692,424 | Habel | Oct. 26, 1954 |
| 2,825,126 | Legat et al. | Mar. 4, 1958 |